US009482912B2

(12) United States Patent
Moriwaki

(10) Patent No.: US 9,482,912 B2
(45) Date of Patent: Nov. 1, 2016

(54) CIRCUIT BOARD, DISPLAY DEVICE, AND LIQUID CRYSTAL DISPLAY DEVICE

(75) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1199 days.

(21) Appl. No.: 12/670,763

(22) PCT Filed: Mar. 28, 2008

(86) PCT No.: PCT/JP2008/056095
§ 371 (c)(1),
(2), (4) Date: Jan. 26, 2010

(87) PCT Pub. No.: WO2009/016858
PCT Pub. Date: Feb. 5, 2009

(65) Prior Publication Data
US 2010/0194723 A1 Aug. 5, 2010

(30) Foreign Application Priority Data

Jul. 27, 2007 (JP) ................................ 2007-196350

(51) Int. Cl.
*G02F 1/1345* (2006.01)
*G02F 1/1347* (2006.01)
*G02F 1/133* (2006.01)

(52) U.S. Cl.
CPC ............ *G02F 1/1345* (2013.01); *G02F 1/133* (2013.01); *G02F 1/1347* (2013.01); *G02F 1/13452* (2013.01); *G02F 1/13454* (2013.01)

(58) Field of Classification Search
CPC ............. G02F 1/1345; G02F 1/13452; G02F 1/1347; G02F 1/13454; G02F 1/133
USPC .................................................. 345/204–206
See application file for complete search history.

(56) References Cited

U.S. PATENT DOCUMENTS

2002/0105263 A1* 8/2002 Kim ............................ 313/498
2005/0253141 A1* 11/2005 Ohta et al. ...................... 257/59

FOREIGN PATENT DOCUMENTS

| JP | 3-58019 | 3/1991 |
|---|---|---|
| JP | 2004-219712 | 8/2004 |
| JP | 2005-43804 | 2/2005 |

OTHER PUBLICATIONS

Chinese Office Action and English translation thereof mailed Jan. 26, 2011 in Chinese application 200880015960.8.
International Search Report for PCT/JP2008/056095, mailed Jun. 17, 2008.

* cited by examiner

*Primary Examiner* — Towfiq Elahi
*Assistant Examiner* — Saifeldin Elnafia
(74) *Attorney, Agent, or Firm* — Nixon & Vanderhye P.C.

(57) ABSTRACT

A circuit board includes a driver circuit for driving a pixel and an external connection terminal, on a substrate. The circuit board includes a wiring that is arranged just below the external connection terminal, and in a layer lower than the external connection terminal to overlap therewith.

44 Claims, 12 Drawing Sheets

CIRCUIT BOARD, DISPLAY DEVICE, AND LIQUID CRYSTAL DISPLAY DEVICE

This application is the U.S. national phase of International Application No. PCT/JP2008/056095 filed 28 Mar. 2008, which designated the U.S. and claims priority to JP Application No. 2007-196350 filed 27 Jul. 2007, the entire contents of each of which are hereby incorporated by reference.

TECHNICAL FIELD

The present invention relates to a circuit board, a display device, and a liquid crystal display device. More particularly, the present invention relates to a circuit board preferably used in mobile devices such as a cellular phone, and to a display device and a liquid crystal display device, each including such a circuit board.

BACKGROUND ART

Portable electronic devices such as a cellular phone and a PDA including a liquid crystal display device, an organic electroluminescent display device, and the like, now need a further reduction in its size and weight. Along with this, downsize of a periphery of a display region, i.e., a reduction in area of a frame region is needed, and a technology of satisfying such a need is now being researched and developed. In addition, in view of the reduction in thickness and costs, and the like, a display device including a full-monolithic circuit board where a peripheral circuit needed for driving a driver circuit and the like is arranged on a substrate is increasingly employed. According to such a full-monolithic circuit board-including display device, a circuit for driving pixels is arranged on a circuit board, which increases a region (frame region) except for a display region of the board. So a reduction in frame region of such a device is being researched and developed.

In a conventional display device, a wiring that is formed inside a panel is made of aluminum and this wiring is extended to the outside of the panel to be used as an external connection terminal. In such a case, the aluminum film might be corroded. In view of this, the aluminum film that is used as a wiring formed inside the panel is connected to a metal film that is arranged in a layer lower than the aluminum film, and this metal film is extended to the panel outside (for example, refer to Patent Document 1).

Patent Document 1 also discloses the following embodiment as an embodiment where corrosion of the external connection terminal is prevented. An aluminum film is used as a wiring formed inside the panel, and this film is extended to the outside of the panel and used as an external connection terminal. An end of the aluminum film, which is exposed to the outside of the panel, is covered with a chromium (Cr) film and an indium tin oxide (ITO) film, thereby preventing the corrosion of the external connection terminal.

[Patent Document 1]
Japanese Kokai Publication No. Hei-03-58019

DISCLOSURE OF INVENTION

In an embodiment like that in Patent Document 1, where the wiring formed inside the panel is connected to a metal film formed in a layer lower than the wiring and the metal film is extended to be used as an external connection terminal, a region where the external connection terminal is arranged and a region where the wiring formed inside the panel is arranged need to be individually formed, which increases an area of the frame region. In this point, this embodiment needs to be improved.

The present invention has been made in view of the above-mentioned state of the art. The present invention has an object to provide a circuit board, a display device, and a liquid crystal display device, each including a frame region with a reduced area.

The present inventor made various investigations on a circuit board that permits a reduction in frame region of a display device. The inventor noted arrangement of an external connection terminal. Then, the inventor found the followings. According to a conventional display device, a wiring formed inside a panel is connected to a metal film arranged in a layer lower than the wiring, and the metal film is extended to be used as a connection terminal. Thus, a region that is used as an external connection terminal and a wiring region are individually formed. This leads to an increase in area of a frame region. Further, the inventor found that the area of the frame region can be decreased if the wiring is arranged in a layer lower than the external connection terminal to overlap therewith. As a result, the above-mentioned problems have been admirably solved, leading to completion of the present invention.

That is, the present invention is a circuit board including a driver circuit for driving a pixel and an external connection terminal, on a substrate,
wherein the circuit board further includes a wiring that is arranged in a layer lower than the external connection terminal to overlap therewith.

The present invention is mentioned in detail below.

The circuit board of the present invention includes a driver circuit for driving pixels and an external connection terminal on a substrate. The above-mentioned pixels are minimum units constituting a display image, and for example, it means a point that displays a single color such as red, green, and blue when the circuit board of the present invention is applied to a display device for color display. That is, the pixels may be sub-pixels. The above-mentioned driver circuit is a circuit for driving the pixels. A source driver circuit, a gate driver circuit, and the like, are mentioned as the driver circuit. The driver circuit is composed of a circuit such as a transmission gate, a latch circuit, a timing generator, an inverter including a power circuit. The above-mentioned external connection terminal is a terminal for electrically connecting wirings formed in the circuit board (circuit) to the outside of the circuit board (other members). In the present description, the kind of the "circuit" is not especially limited, but the "circuit" is preferably a circuit used in a circuit board for display devices (more preferably, for liquid crystal display devices).

The above-mentioned circuit board includes a wiring that is arranged in a layer lower than the external connection terminal to overlap therewith. In the present description, when A is arranged in a layer lower than B to overlap therewith, A is arranged in a layer lower than B and in a region overlapping with B. The term "upper" means a direction away from the substrate, and the term "lower" means a direction closer to the substrate. In the present description, when A is arranged in a layer lower than B, A may or may not overlap with B. The above-mentioned wiring is not especially limited. Wirings constituting a circuit such as a driver circuit and an ESD (electrostatic discharge) protective circuit, and connection wirings that are connected to the external connection terminal are mentioned as the above-mentioned wiring. Examples of the connection wirings include: a drawing wiring for transmitting a signal from the external connection terminal to the driver circuit;

and a power source wiring for supplying power for driving a circuit from the external connection terminal. At least one of these wirings is arranged in a layer lower than the external connection terminal to overlap therewith, and thereby the area of the frame portion can be decreased. According to the present invention, the entire wiring or a part of the wiring may be arranged in a layer lower than the external connection terminal to overlap therewith. The proportion of the part that is arranged in a layer lower than the external connection terminal to overlap therewith relative to the entire wiring is not especially limited.

Preferable embodiments of the present invention are mentioned below. The following embodiments may be appropriately combined.

According to the above-mentioned circuit board, at least one wiring of the circuit-constituting wirings and the connection wirings including the drawing wiring and the power source wiring is arranged in a layer lower than the external connection terminal to overlap therewith. As a result, a wiring area can be decreased.

It is preferable that as the wiring, a connection wiring that is connected to the external connection terminal is arranged.

It is preferable that as the wiring, a drawing wiring that transmits a signal from the external connection terminal to the driver circuit is arranged.

It is preferable that as the wiring, a power source wiring that supplies a power source for driving a circuit from the external connection terminal is arranged.

It is preferable that as the wiring, a circuit-constituting wiring that constitutes a circuit is arranged.

It is preferable that as the wiring, a drawing wiring that transmits a signal from the external connection terminal to the driver circuit and a power source wiring that supplies a power source for driving a circuit from the external connection terminal are arranged.

It is preferable that as the wiring, a connection wiring that is connected to the external connection terminal and a circuit-constituting wiring that constitutes a circuit are arranged.

It is preferable that as the wiring, a drawing wiring that transmits a signal from the external connection terminal to the driver circuit and a circuit-constituting wiring that constitutes a circuit are arranged.

It is preferable that as the wiring, a power source wiring that supplies a power source for driving a circuit from the external connection terminal and a circuit-constituting wiring that constitutes a circuit are arranged.

It is preferable that as the wiring, a drawing wiring that transmits a signal from the external connection terminal to the driver circuit, a power source wiring that supplies a power source for driving a circuit from the external connection terminal, and a circuit-constituting wiring that constitutes a circuit are arranged.

According to these embodiments, a part of at least one wiring of the circuit-constituting wirings and the connection wirings including the drawing wiring and the power source wiring is arranged in a layer lower than the external connection terminal to overlap therewith, which allows the wiring area to be significantly decreased. As a result, the area of the frame region can be reduced. The "circuit-constituting wirings" used herein means a wiring that is formed inside the circuit. Examples thereof include wirings constituting: a driver circuit including a transmission gate, a latch circuit, a timing generator, an inverter including a power circuit; a protective circuit such as an ESD protective circuit; a buffer circuit; a digital-analogue converter circuit (DAC circuit); a shift resistor; and a sampling memory. The "circuit-constituting wirings" includes a wiring for connecting plural circuits constituting the driver circuit to each other. The "drawing wiring" means a wiring for connecting the driver circuit to the external connection terminal and transmitting a signal fed from the outside to the driver circuit. The "power source wiring" means a wiring that supplies a power source for driving a circuit such as a driver circuit, an ESD protective circuit, a buffer circuit, a DAC circuit, a shift resistor, and a sampling memory from the external connection terminal. It is preferable that the power source wiring has a width larger than that of the drawing wiring in order to supply a large amount of electric current to the power circuit. The "connection wirings" mean a wiring connected to the external connection terminal, such as the drawing wiring and the power source wiring. A source electrode, a drain electrode, a gate electrode, and the like, each constituting a transistor, are also mentioned as the connection wirings when these electrodes are directly connected to the external connection terminal. The above-mentioned external connection terminal can be connected to a connection wiring that is positioned just therebelow and overlaps therewith in an inner side region of the terminal. So just by providing an interlayer film arranged between the external connection terminal and the connection wiring with a contact hole, the external connection terminal can be connected to the connection wiring through the contact hole. It also allows the length of the wiring to be shortened. Thus, the decrease in the wiring area and the reduction in resistance of the wiring contributed to the shortened wiring length can be achieved.

According to the present invention, each of the circuit-constituting wirings and the connection wirings including the drawing wiring and the power source wiring may be entirely or partly arranged in a layer lower than the external connection terminal to overlap therewith. The proportion of the part that is arranged in a layer lower than the external connection terminal to overlap therewith relative to the entire wiring is not especially limited. For example, two circuit-constituting wirings are arranged in different layers, and such wirings may overlap with each other. Similarly, two drawing wirings may be arranged in different layers to overlap with each other, or two power source wirings may be arranged in different layers to overlap with each other. According to this, the area of the frame region can be further decreased.

At least two of the circuit-constituting wiring, the drawing wiring, and the power source wiring, are arranged in the same layer in a layer lower than the external connection terminal to overlap therewith, and thereby the wirings arranged in the same layer can be formed together in the same film-forming and patterning steps. As a result, the number of production steps can be decreased, which leads to an improvement in productivity. Thus, the wirings arranged in the same layer are wirings that can be formed together by patterning a film formed in the same film-forming step.

It is preferable that as the wiring, a drawing wiring that transmits a signal from the external connection terminal to the driver circuit and a power source wiring that supplies a power source for driving a circuit from the external connection terminal are arranged, and the drawing wiring and the power source wiring are arranged in the same layer.

It is preferable that as the wiring, a drawing wiring that transmits a signal from the external connection terminal to the driver circuit and a circuit-constituting wiring that constitutes a circuit are arranged, and the drawing wiring and the circuit-constituting wiring are arranged in the same layer.

It is preferable that as the wiring, a power source wiring that supplies a power source for driving a circuit from the external connection terminal and a circuit-constituting wiring that constitutes a circuit are arranged, and the power source wiring and the circuit-constituting wiring are arranged in the same layer.

It is preferable that as the wiring, a drawing wiring that transmits a signal from the external connection terminal to the driver circuit, a power source wiring that supplies a power source for driving a circuit from the external connection terminal, and a circuit-constituting wiring that constitutes a circuit are arranged, and the drawing wiring, the power source wiring, and the circuit-constituting wiring are arranged in the same layer.

According to these embodiments, if at least two of the circuit-constituting wiring, the drawing wiring, and the power source wiring, formed in a layer lower than the external connection terminal to overlap therewith, are partly arranged in the same layer, the wirings arranged in the same layer can be formed together in the same film-forming and patterning steps. As a result, the number of production steps can be decreased. According to the present invention, each of the drawing wiring, the power source wiring, and the circuit-constituting wiring may be entirely or partly arranged in the same layer. The proportion of the part arranged in the same layer relative to the entire wiring is not especially limited.

At least two of the circuit-constituting wiring, the drawing wiring, and the power source wiring are arranged in a layer lower than the external connection terminal to overlap therewith, and the at least two wirings overlap with each other. As a result, the area where the wirings are arranged (wiring area) can be decreased, which leads to a reduction in area of the frame region.

It is preferable that as the wiring, a drawing wiring that transmits a signal to the driver circuit from the external connection terminal and a power source wiring that supplies a power source for driving a circuit from the external connection terminal are arranged, and the drawing wiring and the power source are arranged to overlap with each other.

It is preferable that as the wiring, a drawing wiring that transmits a signal to the driver circuit from the external connection terminal and a circuit-constituting wiring that constitutes a circuit are arranged, and the drawing wiring and the circuit-constituting wiring are arranged to overlap with each other.

It is preferable that as the wiring, a power source wiring that supplies a power source for driving a circuit from the external connection terminal and a circuit-constituting wiring that constitutes a circuit are arranged, and the power source wiring and the circuit-constituting wiring are arranged to overlap with each other.

It is preferable that as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, and at least two wirings selected from the group consisting of the drawing wiring, the power source wiring, and the circuit-constituting wiring are arranged to overlap with each other.

It is preferable that as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, and the drawing wiring, the power source wiring, and the circuit-constituting wiring are arranged to overlap with one another.

According to these embodiments, if any two of the circuit-constituting wiring, the drawing wiring, and the power source wiring, formed in a layer lower than the external connection terminal, are partly arranged to overlap with each other. In such a case, the wiring area can be further reduced compared with the case where the wirings are arranged in the same layer. As a result, the area of the frame region can be further reduced. The wirings are arranged to overlap with each other, and so the wirings can be flexibly patterned, and therefore the wiring area (area of the region where the wirings are arranged) can be decreased. That is, if the wirings are arranged in the same layer, the wirings can not cross with each other, and so the wirings need to be extended so as not to form a crossing part. According to these embodiments, however, the wirings can be partly crossed with each other, thereby shorten the wiring length. In addition, instead of the reduction in wiring area, the width of the wiring may be increased, thereby decreasing the resistance of the wiring. The drawing wiring and the power source wiring are connected to the external terminal, and so it is preferable that the drawing wiring and/or the power source wiring are/is arranged in a layer upper than the circuit-constituting wiring. The layer of the respective wirings is not especially limited. The circuit-constituting wiring and/or the power source wiring may be arranged in a layer upper than the drawing wiring, or the drawing wiring and/or the circuit-constituting wiring may be arranged in a layer upper than the power source wiring. With regard to the arrangement order of the wirings, it is preferable that the power source wiring, the drawing wiring, and the circuit-constituting wiring are arranged in this order from the upper layer side. The upper layer tends to be misaligned because of an uneven surface attributed to wirings that are arranged in lower layers and of a reduction in stacking accuracy. So the upper layer is difficult to finely form. In view of this, it is preferable that the drawing wiring, which typically has a wide width, and the power source wiring, which may be typically formed with a low alignment accuracy compared with the circuit-constituting wiring, and the like, are arranged in a layer upper than the circuit-constituting wiring. According to the circuit board of the present invention, the drawing wiring, the power source wiring, and the circuit-constituting wiring may be arranged to entirely or partly overlap with one another. The proportion of the overlapping part relative to the entire wiring is not especially limited.

It is preferable that as the wiring, a drawing wiring that transmits a signal to the driver circuit from the external connection terminal and a power source wiring that supplies a power source for driving a circuit from the external connection terminal are arranged, and the drawing wiring, the power source wiring, and a circuit are arranged to overlap with one another. According to these embodiment, the same advantages as in the embodiment in which as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, and the drawing wiring, the power source wiring, and the circuit-constituting wiring are arranged to overlap with one another can be obtained.

Any two of the circuit-constituting wiring, the drawing wiring, and the power source wiring, formed in a layer lower than the external connection terminal to overlap therewith, are arranged in the same layer, and the rest wiring overlaps with one of the two wiring arranged in the same layer. As a result, the improvement in productivity and the reduction in frame region can be efficiently achieved.

It is preferable that as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, the drawing wiring and the power source wiring are arranged in the same layer, and the circuit-constituting wiring is arranged to overlap with at least one of the drawing wiring and the power source wiring.

It is preferable that as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, the drawing wiring and the circuit-constituting wiring are arranged in the same layer, and the power source wiring is arranged to overlap with at least one of the drawing wiring and the circuit-constituting wiring.

It is preferable that as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, the power source wiring and the circuit-constituting wiring are arranged in the same layer, and the drawing wiring is arranged to overlap with at least one of the power source wiring and the circuit-constituting wiring.

According to these, advantages of the above-mentioned both cases where any two of the circuit-constituting wiring, the drawing wiring, and the power source wiring are arranged in the identical layer lower than the external connection terminal and where the two wirings are arranged to overlap with each other in different layers lower than the external connection terminal.

It is preferable that as the wiring, a drawing wiring that transmits a signal to the driver circuit from the external connection terminal and a power source wiring that supplies a power source for driving a circuit from the external connection terminal are arranged, the drawing wiring and the power source wiring are arranged in the same layer, and at least one of the drawing wiring and the power source wiring is arranged to overlap with a circuit. According to this embodiment, the same advantages as in the embodiment as the wiring, a drawing wiring that transmits a signal to the driver circuit from the external connection terminal, a power source wiring that supplies a power source for driving a circuit from the external connection terminal, and a circuit-constituting wiring that constitutes a circuit are arranged, the drawing wiring and the power source wiring are arranged in the same layer, and the circuit-constituting wiring is arranged to overlap with at least one of the drawing wiring and the power source wiring can be obtained.

It is preferable that as the wiring, two or more connection wirings that are connected to the external connection terminal are arranged, and at least one of the two or more connection wirings is arranged in a layer different from the other or other connection wirings to overlap therewith. According to this embodiment, the wiring area can be further decreased, and thereby the area of the frame region can be reduced. For example, FIG. 10 is a plan view schematically showing an embodiment where the external connection terminals and the connection wirings are connected to each other when the connection wirings are arranged in different layers to overlap with one another. As shown in FIG. 10, connection wirings 16a to 16c are arranged to partly overlap with one another, an external connection terminal 20a is connected to the connection wiring 16a through a contact hole 25a, an external connection terminal 20b is connected to the connection wiring 16b through a contact hole 25b, and an external connection terminal 20c is connected to the connection wiring 16c through a contact hole 25c. In the embodiment shown in FIG. 10, it is preferable that the connection wirings 16a to 16c are stacked in this order from the substrate side, and in the part where the wirings 16a to 16c overlap with one another, an insulating film is arranged between the connection wirings 16a and 16b and between the connection wirings 16b and 16c. The external connection terminal may be directly connected to a source electrode, a drain electrode, or a gate electrode, and the like, of a transistor. If the above-mentioned wiring includes two or more connection wirings connected to the external connection terminal, the two or more connection wirings may be connected to one external connection terminal or to two or more external connection terminals, respectively. The number of the connection wiring connected to one external connection terminal is not especially limited. In the embodiment shown in FIG. 10, the width is different among the connection wirings 16a to 16c, but it may be the same.

It is preferable that as the wiring, a connection wiring that is connected to the external connection terminal is arranged, and the connection wiring is connected to the external connection terminal in a layer lower than the external connection terminal. That is, it is preferable that the above-mentioned connection wiring is connected to the external connection terminal just therebelow. According to this, the external connection terminal is connected to the connection wiring that is positioned just therebelow through a contact hole, and so a drawing area of the connection wiring can be decreased. The reduction in resistance contributed to the decrease in length of the connection wiring can be achieved. Such an embodiment includes an embodiment shown in FIG. 11(a) where the connection wiring is connected to the external connection terminal and the connection wiring does not overlap with other external connection terminals.

It is preferable that the circuit board includes two or more of the external connection terminals, the connection wiring overlaps with another or other of the external connection terminals different from the external connection terminal to which the connection wiring is connected. If two or more connection wirings are arranged, any one of the wirings overlaps with an external connection terminal different from the terminal to which the wiring itself is connected. The other or other connection wirings may not overlap with the external connection terminal to which the connection wiring itself is connected.

An embodiment in which an end of an external connection terminal is connected to a connection wiring such as a drawing wiring and a power source wiring (for example, see FIG. 9-1) is mentioned as a method of connecting the external connection terminal to the drawing wiring or the power source wiring. However, in this case, the connection wiring needs to be extended to the external connection terminal. So the drawing area of the connection wiring can not be effectively decreased. In the present invention, the external connection terminal can be directly connected to the connection wiring positioned just therebelow through a contact hole. So the drawing area of the connection wiring can be decreased. The reduction in resistance contributed to the decrease in length of the connection wiring can be achieved. According to the above-mentioned circuit board, the connection wiring can be arranged to overlap with an external connection terminal different from the terminal to which the connection wiring is connected. So the wiring area can be decreased. If a plurality of connection wirings are arranged in parallel in the same layer just below the external connection wiring, for example, as shown in FIG. 11(a), end regions of external connection terminals 20d are connected to connection wirings 16d through contact holes 25d respectively, and each of the connection wirings 16d does not overlap with the terminals except for the corresponding terminal 20d, and as a result, some of the terminals 20d possibly have a short wiring length. Such terminals 20d have a small area, which makes difficult to connect the respective terminals to the outside. As shown in FIG. 11(b), if the inside regions of external connection terminals 20e are connected to connection wirings 16e through contact holes 25e respectively and each of the connection wirings 16e overlap with the terminals 20e except for the corresponding terminal 20e, the area of each external connection terminal does not need to be changed and a plurality of external connection terminals are arranged to have the same size. As a result, the external connection terminals can be easily connected to the outside, and the contact resistance is not reduced.

If the above-mentioned two or more connection wirings are arranged, the two or more connection wirings may be connected to one external connection terminal or to two or more external connection terminals, respectively. It is preferable that two connection wirings are connected to one external connection terminal. For example, an embodiment shown in FIG. 11(c) where two connection wirings 16f and 16i may be connected to one external connection terminal 20f through contact holes 25f and 25i respectively may be mentioned. According to this embodiment, a signal is transmitted through two connection wirings, and so each connection wiring can be formed to have a smaller width. In this case, an external connection terminal 20g is connected to a connection wiring 16g through a contact hole 25g. An external connection terminal 20h is connected to a connection wiring 16h through a contact hole 25h. It is preferable that at least two connection wirings are arranged in different layers. For example, as shown in FIG. 11(d), if connection wirings 16j, 16k, and 16l are arranged in the same layer and if a connection wiring 16m is arranged in a layer different from the layer where the connection wirings 16j, 16k, and 16l are arranged, the two connection wirings 16j and 16m are connected to an external connection terminal 20j through contact holes 25j and 25m, respectively. In this case, an external connection terminal 20k is connected to the connection wiring 16k through the contact hole 25k. An external connection terminal 20l is connected to the connection wiring 16l through the contact hole 25l. The external connection terminal to which two (or more) connection wirings arranged in different layers are connected is not especially limited. The two (or more) connection wirings may be connected to the same or different external connection terminals.

If as the wiring, a drawing wiring that transmits a signal from the external connection terminal to the driver circuit, a power source wiring that supplies a power source for driving a circuit from the external connection terminal, and a circuit-constituting wiring that constitutes a circuit are arranged, it is preferable that the circuit board includes a first interlayer film and a second interlayer film, and the first interlayer film; the drawing wiring and the power source wiring; and the second interlayer film are stacked in this order in layers upper than the circuit-constituting wiring. According to this embodiment, the drawing wiring and the power source wiring are arranged in the same layer and can be formed together in the same film-formation and patterning steps. As a result, the number of production steps can be decreased. The drawing wiring and the power source wiring are wirings connected to the external connection terminal(s). Each of the drawing wiring and the power source wiring can be provided with a contact hole through which the wiring is connected to the external connection terminal in the same patterning step. As a result, the production steps can be simplified. It is preferable that each of the first and second interlayer films has a flat surface on a side opposite to the substrate side, and each is a flattening film having a flat surface with a surface roughness of 500 nm or less. The surface roughness of the flat surface is reduced, and thereby a wiring and the like that is arranged on the first and/or second interlayer film (s) has an even surface. As a result, disconnection of the wiring and the like can be prevented.

If as the wiring, a drawing wiring that transmits a signal from the external connection terminal to the driver circuit, a power source wiring that supplies a power source for driving a circuit from the external connection terminal, and a circuit-constituting wiring that constitutes a circuit are arranged, it is preferable that the circuit board includes a first interlayer film, a second interlayer film, and a third interlayer film, the first interlayer film, the drawing wiring, the second interlayer film, the power source wiring, and the third interlayer film are stacked in this order in layers upper than the circuit-constituting wiring. In the above-mentioned embodiment, it is preferable that the circuit board includes a first interlayer film, a second interlayer film, and a third interlayer film, the first interlayer film, the power source wiring, the second interlayer film, the drawing wiring, and the third interlayer film are stacked in this order in layers upper than the circuit-constituting wiring. According to these embodiments, the drawing wiring and the power source wiring are formed in different layers, and so these wirings can overlap with each other, which leads to a decrease in wiring area. As a result, the area of the frame region can be reduced. It is preferable that each of the first to third interlayer films has a flat surface on a side opposite to the substrate side, and each is a flattening film having a flat surface with a surface roughness of 500 nm or less. The surface roughness of the flat surface is reduced, and thereby a wiring and the like that is arranged on the first, second, and/or third interlayer film(s) has an even surface. As a result, disconnection of the wiring and the like can be prevented.

It is preferable that the external connection terminal is a multi-layer body including an aluminum-containing film and an anti-corrosion conductive film. It is more preferable that the aluminum-containing film and the anti-corrosion conductive film are stacked in this order from the substrate side to constitute the external connection terminal. The anti-corrosion conductive film is not especially limited as long as it is formed from a material that shows higher corrosion resistance to salt, acid, alkali, moisture or oxygen than that of the aluminum-containing film. The anti-corrosion conductive film may be composed of a plurality of films or may be formed from a plurality of materials. It is preferable that the anti-corrosion conductive film is composed of a material that is difficult to be corroded by salt, acid, alkali, moisture, and oxygen compared with an aluminum-containing film. Examples of the material for the anti-corrosion conductive film include indium zinc oxide, indium tin oxide, titanium, molybdenum, and tungsten. The "corrosion" used herein preferably means a reduction in conductivity, elution, and separation from a lower layer. It is preferable in view of productivity that the external connection terminal is formed together in a step of forming another metal film. It is preferable that the anti-corrosion conductive film is arranged on a side surface and a surface on a side opposite to the substrate side of the aluminum-containing film. Examples of the above-mentioned wiring include wirings such as a wiring constituting a driver circuit, an ESD protective circuit, and wirings such as a connection wiring connected to the external connection terminal. Examples of the connection wiring include: a drawing wiring that transmits a signal from the external connection terminal to the driver circuit; and a power source wiring that supplies a power source for driving a circuit from the external connection terminal. The wirings are arranged in a layer lower than the external connection terminal to overlap therewith, and thereby the area of the frame region can be significantly reduced. The above-mentioned aluminum-containing film is not necessarily a film composed of only aluminum, but may be a film including aluminum. Examples of the aluminum-containing film include an aluminum film formed of elemental aluminum and an aluminum-silicon alloy film formed of aluminum and silicon. The use of the aluminum-silicon alloy film brings an effect of improving heat resistance.

It is preferable that the anti-corrosion conductive film is an indium zinc oxide film, and the aluminum-containing film and the indium zinc oxide film are stacked in this order from a side of the substrate to constitute the external connection terminal.

If the anti-corrosion conductive film is an indium zinc oxide film, and the aluminum-containing film and the indium zinc oxide film are stacked in this order from a side of the substrate to constitute the external connection terminal, it is preferable that an indium tin oxide film, the aluminum-containing film, and the indium zinc oxide film are stacked in this order from the side of the substrate to constitute the external connection terminal. According to these embodiments, the anti-corrosion conductive film is composed of an indium zinc oxide film and so it can be patterned together with the aluminum-containing film in the same etching step, and further electrolytic corrosion is not generated. As a result, the productivity and reliability can be improved. If the indium tin oxide film is arranged in a layer lower than the aluminum-containing film to overlap therewith, it is more preferable that the indium tin oxide film, a molybdenum film, the aluminum-containing film, and then indium zinc oxide film are stacked in this order from the substrate side to constitute the external connection terminal. Between the indium tin oxide film and the aluminum-containing film, a conductive film such as a molybdenum film is arranged, and thereby, electric corrosion between the aluminum-containing film and the indium tin oxide film, which might be generated when the aluminum-containing film is patterned, can be prevented.

If the anti-corrosion conductive film is an indium zinc oxide film, and the aluminum-containing film and the indium zinc oxide film are stacked in this order from a side of the substrate to constitute the external connection terminal, it is preferable that the circuit board includes, in the pixel, a transparent electrode including the indium zinc oxide film. Both of the transparent electrode and the external connection terminal include the indium zinc oxide film and so they can be formed in the same film-formation and patterning steps. As a result, the number of production steps can be decreased. The electrolytic corrosion is not generated when the indium zinc oxide film is etched together with the aluminum-containing film in the same patterning step.

It is preferable that the anti-corrosion conductive film is an indium tin oxide film, and the aluminum-containing film and the indium tin oxide film are stacked in this order from a side of the substrate to constitute the external connection terminal.

It is more preferable that an indium zinc oxide film, the aluminum-containing film, and the indium tin oxide film are stacked in this order from the side of the substrate to constitute the external connection terminal.

According to these embodiments, the indium tin oxide film is arranged in a layer upper than the aluminum-containing film to overlap therewith, and thereby the corrosion of the aluminum-containing film can be prevented.

If the anti-corrosion conductive film is an indium tin oxide film, and the aluminum-containing film and the indium tin oxide film are stacked in this order from a side of the substrate to constitute the external connection terminal, it is preferable that the circuit board includes, in the pixel, a transparent electrode including the indium tin oxide film. The indium tin oxide film is used as a transparent electrode, and so if the indium tin oxide film is used as the external connection terminal, the transparent electrode and the indium tin oxide film constituting the external connection terminal can be formed together in the same film-formation and patterning steps.

If the external connection terminal is a multi-layer body including an aluminum-containing film and an anti-corrosion conductive film, it is preferable that the circuit board includes, in the pixel, a reflective electrode including a film constituting the external connection terminal. The reflective electrode includes a film constituting the external connection terminal, and thereby they can be formed together in the same film-formation and patterning steps. As a result, the number of production steps can be decreased.

Also in an embodiment where the above-mentioned external connection terminal does not include at least one of the aluminum-containing film and the anti-corrosion conductive film, it is preferable that the circuit board includes, in the pixel, a reflective electrode including a layer constituting the external connection terminal. The reflective electrode and the external connection terminal may have an embodiment in which at least one of the aluminum-containing film and the anti-corrosion conductive film is not included. Also in this embodiment, the number of production steps can be decreased, leading to an improvement in productivity.

If the external connection terminal is a multi-layer body including an aluminum-containing film and an anti-corrosion conductive film and if the circuit board includes, in the pixel, a reflective electrode including a film constituting the external connection terminal, it is preferable that the anti-corrosion conductive film is an indium tin oxide film, and the aluminum-containing film and the indium tin oxide film are stacked in this order from a side of the substrate to constitute the reflective electrode. According to this, if the above-mentioned circuit board is applied in a semi-transmissive liquid crystal display device and an electrode (counter electrode) opposite to the reflective electrode is composed of an indium tin oxide film, the reflective electrode and the counter electrode are formed from the same material, and so generation of flicker can be suppressed and the corrosion of the aluminum-containing film of the external connection terminal can be prevented.

If the external connection terminal is a multi-layer body including an aluminum-containing film and an anti-corrosion conductive film, it is preferable that in the external connection terminal, the anti-corrosion conductive film covers a side surface and a surface on a side opposite to the substrate of the aluminum-containing film. The aluminum-containing film is a metal that is easily corroded by being exposed to air. The side surface and the surface on the side opposite to the substrate side of the aluminum-containing film are covered with the anti-corrosion conductive film, and thereby electrolytic corrosion of the aluminum-containing film can be prevented. A surface on the substrate side of the aluminum-containing film does not need to be covered with the anti-corrosion conductive film because it is typically covered with another film.

If the external connection terminal is a multi-layer body including an aluminum-containing film and an anti-corrosion conductive film, it is preferable that the circuit board includes, in the pixel, a reflective electrode including the aluminum-containing film and an indium tin oxide film, stacked in this order from a side of the substrate, the anti-corrosion conductive film is an indium tin oxide film, and in each of the external connection terminal and the reflective electrode, the anti-corrosion conductive film covers a side surface and a surface on a side opposite to the substrate of the aluminum-containing film. If wet etching is performed with the aluminum-containing film and the indium tin oxide film being exposed, electrolytic corrosion between the aluminum-containing film and the indium tin oxide film is generated, and so the two films might be separated from each other. The side surface and the surface on the side opposite to the substrate side of the aluminum-containing film constituting the external connection terminal and the reflective electrode are covered with an indium tin oxide film, and thereby the aluminum-containing film is not exposed to an etching solution, and so the electrolytic corrosion is not generated. As a result, the reliability is improved.

It is preferable that the external connection terminal is arranged to overlap with a region where a sealing member for attaching the circuit board to another substrate is arranged, and in the region, an insulating film is arranged on the external connection terminal (on the side opposite to the substrate of the external connection terminal). If the circuit board is applied in a liquid crystal display device, the circuit board is attached to another substrate, and liquid crystals are interposed therebetween to provide display. If applied in a gas discharging panel (plasma display panel), the circuit board is attached to another substrate, and between them, discharge gas is injected. Also in other display panels, the circuit board is typically attached to another substrate, for example, in order to prevent deterioration of display elements. If a sealing member used for attachment is arranged just above the external connection terminal to overlap therewith, a pressure is applied to the external connection terminal at the time of attachment, and so the terminal might be disconnected. An insulating film is arranged between the sealing member and the external connection terminal, and thereby disconnection of the terminal can be suppressed and further adhesion of the sealing member can be improved. The thickness of the insulating film influences the distance between the substrates, and so it is preferable that the thickness of the insulating film is set to be small in accordance with an optimum distance between the substances. A photosensitive acrylic resin film and the like is used as the insulating film.

It is preferable that the external connection terminal is positioned outside a region where a sealing member for attaching the circuit board to another substrate is arranged. According to this embodiment, the external connection terminal and the sealing member are formed in different regions, and thereby even if the external connection terminal is exposed without being covered with an insulating film, the sealing member can be directly attached to a film constituting the outermost surface of the circuit bard (typically, an insulating film such as the third interlayer film), and so the two can be more tightly attached to each other. The sealing member is not arranged on the external connection terminal, and so a pressure to the external connection terminal is not applied when the substrates are attached to each other. As a result, disconnection of the wiring, and the like, can be prevented.

The present invention is further a display device including the circuit board. The above-mentioned circuit board is included in a display device such as a liquid crystal display device and an organic electroluminescent display device. It is preferable that the circuit board is included in a liquid crystal display device. The present invention is a liquid crystal display device including the circuit board. If the display device and the liquid crystal display device each include the circuit board of the present invention, the area of the frame region can be decreased. As a result, the display device and the liquid crystal display device each having a small frame region can be provided.

Effect of the Invention

According to the circuit board of the present invention, the wiring is arranged in a layer lower than the external connection terminal to overlap therewith, and thereby the area of the frame region can be decreased. The external connection terminal includes the anti-corrosion conductive film and so the corrosion of the external connection terminal can be prevented. In addition, the external connection terminal is formed together with the transparent electrode and/or the reflective electrode constituting the pixel electrode in the same film-formation and patterning steps, and thereby, the frame region can be decreased without increasing the number of production steps. Further, disconnection of the external connection terminal can be prevented by arranging an insulating film between the external connection terminal and the sealing member or by arranging the external connection terminal on the panel edge side of the sealing member.

BEST MODES FOR CARRYING OUT THE INVENTION

The present invention is mentioned in more detail below with reference to Embodiments using drawings, but not limited thereto. In Embodiments 1 to 8, circuit boards for a semi-transmissive liquid crystal display device are mentioned, but the present invention is not limited thereto, and the circuit board of the present invention can be used for any kinds of display devices.

Embodiment 1

FIG. 1-1 is a plan view schematically showing a configuration of a circuit board in accordance with Embodiment 1.

FIG. 1-1 shows an embodiment in which a circuit region 50 and a drawing wiring region 60 are arranged in layers lower than an external connection terminal 120. In this embodiment, an area of a display region 70 can be increased. The "circuit region" means a region where circuit-constituting wirings are densely arranged. The "drawing wiring region" means a region where drawing wirings that transmit electrical signals to a driving circuit are densely arranged.

In the display region 70, pixel electrodes each composed of a reflective electrode and a transparent electrode are arranged. FIG. 1-2 is an enlarged plan view schematically showing an arrangement relationship between drawing wirings 116b and the external connection terminals 120 in the drawing wiring region 60 in FIG. 1-1. As shown in FIG. 1-2, the drawing wirings 116b are arranged in a layer lower than the external connection terminals 120 to overlap therewith and each connected to a specific terminal 120 through a contact hole 125. Thus, if the drawing wiring region 60 and the circuit region 50 are arranged in layers lower than the terminals 120, i.e., if the drawing wirings and the circuit-constituting wirings are arranged in layers lower than the terminals 120, a wiring area (an area of a region where the wirings are arranged) can be decreased.

FIG. 1-3 is a cross-sectional view schematically showing a configuration of a periphery of the external connection terminal in the circuit board in accordance with Embodiment 1. FIG. 1-4 is a plan view schematically showing the configuration of the periphery of the external circuit terminal of the circuit board in accordance with Embodiment 1. FIG. 1-5 is a cross-sectional view schematically showing a configuration of a pixel electrode arranged in the display region 70 of the circuit board in accordance with Embodiment 1.

In the circuit board of Embodiment 1, as shown in FIG. 1-3, a base coat film 11 composed of a silicon oxide nitride (SiON) film with a thickness of 50 nm and a silicon oxide (SiO$_x$) film with a thickness of 100 nm; a semiconductor layer 12 composed of a polycrystalline silicon (p-Si) film with a thickness of 50 nm; and a gate insulating film 13 composed of a SiO$_x$ film with a thickness of 45 nm, are stacked in this order on a substrate 10.

On the gate insulating film 13, a gate electrode 14 composed of a tantalum nitride (TaN) film with a thickness of 30 nm and a tungsten (W) film with a thickness of 370 nm is arranged in a region overlapping with a channel region of the semiconductor layer 12. Thereon, a first interlayer insulating film 117 is arranged to cover the entire substrate. A first source-drain electrode 115 is arranged on the first interlayer insulating film 117 and connected to the semiconductor layer 12 through a contact hole formed in the gate insulating film 13 and the first interlayer insulating film 117. A second interlayer insulating film 118 is arranged on the first source-drain electrode 115. The first source-drain electrode 115 includes not only the wiring connected to the semiconductor layer 12, but also a wiring that is arranged between the first interlayer insulating film 117 and a second interlayer insulating film 118 mentioned below and that is formed together with the electrode connected to the semiconductor layer 12 in the same film-forming and patterning steps.

A second source-drain electrode 116a, a drawing wiring 116b, and a power source wiring 124 are arranged on the second interlayer insulating film 118. The second source-drain electrode 116a is connected to the semiconductor layer 12 through a contact hole formed in the gate insulating film 13, and the first and second interlayer insulating films 117 and 118. A part of the drawing wiring 116b is connected to the first source-drain electrode 115 through a contact hole formed in the second interlayer insulating film 118. A third interlayer insulating film 119 is formed in a layer upper than the second source-drain electrode 116a, the drawing wiring 116b, and the power source wiring 124. A device (TFT in the present Embodiment) composed of the gate electrode 14, the first and second source-drain electrodes 115 and 116a, and the like, constitutes a circuit such as a driver circuit. Thus, the gate electrode 14, the first and second source-drain electrodes 115 and 116a correspond to the circuit-constituting wiring. As shown in FIG. 1-3, the circuit region may overlap with the drawing wiring region. The second source-drain electrode 116a, the drawing wiring 116b, and the power source wiring 124 are formed in the same layer. In addition, the drawing wiring 116b and the power source wiring 124 are arranged to overlap with the first source-drain electrode 115.

The external connection terminal 120 is arranged on the third interlayer insulating film 119. The terminal 120 is composed of an ITO (indium tin oxide) layer 120a with a thickness of 100 nm, a Mo (molybdenum) layer 120c with a thickness of 100 nm, an Al (aluminum) layer 120d with a thickness of 100 nm, and an IZO (indium zinc oxide (registered trade name)) layer 120e with a thickness of 10 nm, stacked in this order from the substrate 10 side. The terminal 120 is connected to the drawing wiring 116b through a contact hole formed in the third interlayer insulating film 119. A sealing member 121 for attaching this board to another substrate is formed on a part of the external connection terminal 120. As shown in FIG. 1-4, on the inner side of the ITO layer 120a, the Mo layer 120c, the Al layer 120d, and the IZO layer 120e are formed in this order in such a way that edges thereof are aligned to constitute the external connection terminal 120. Through a contact hole 125 positioned on the outer side (on the left side in FIG. 1-3) of the sealing member 121, the external connection terminal 120 is connected to the drawing wiring 116b. As shown in FIG. 1-5, a pixel electrode 131 arranged in the display region 70 is arranged on the third interlayer insulating film 119. The pixel electrode 131 is composed of a transparent electrode 131a formed in a transmissive display region and a reflective electrode 131b. The transparent electrode 131a is composed of an ITO layer arranged on the entire pixel region. The reflective electrode 131b is composed of an Mo layer 131c, an Al layer 131d, and an IZO layer 131e, stacked in this order in a reflection display region. The ITO layer and the layers 131c to 131e have the same thicknesses as in the layers constituting the terminal 120, respectively. The terminal 120 is connected to the drawing wiring 116b, but may be connected to the power source wiring 124 or another external connection terminal.

A production method of the circuit board of Embodiment 1 is mentioned below.

The substrate 10 is rinsed and pre-annealed as pretreatments. The substrate 10 is not especially limited, and a glass substrate, a resin substrate, and the like, are preferable in view of costs, and the like. The following steps (1) to (16) are performed then.

(1) Step of Forming Base Coat Film

The base coat film 11 is formed by forming a SiON film and a $SiO_2$ film in this order on the substrate 10 by PECVD (plasma enhanced chemical vapor deposition). A mixed gas of monosilane ($SiH_4$), nitrous oxide gas ($N_2O$), and ammonia ($NH_3$), and the like, is mentioned as a raw material gas for forming the SiON film. It is preferable that the $SiO_x$ film is formed using TEOS (tetraethyl ortho silicate) gas as a raw material gas. A silicon nitride ($SiN_x$) film and the like, formed using a mixed gas of monosilane ($SiH_4$) and ammonia ($NH_3$) as a raw material gas may be used as the base coat film 11.

(2) Step of Forming Semiconductor Layer

An amorphous silicon (a-Si) film is formed by PECVD. $SiH_4$, disilane ($Si_2H_6$), and the like, may be used as a raw material gas for forming the a-Si film. Hydrogen exists in the a-Si film formed by PECVD, and so the film is subjected to a treatment for reducing the concentration of the hydrogen (dehydeneration treatment) at about 500° C. Then, a metal catalyst may be applied on the a-Si film as a pretreatment for forming a CG (continuous grain)-silicon film. Successively, the a-Si film is melt by laser annealing, and then cooled and solidified to give a p-Si film. For example, excima laser annealing is employed as the laser annealing. A heat treatment for solid phase crystallization may be performed as a pretreatment before the laser annealing. Then, the p-Si film is patterned by dry etching using carbon tetrafluoride ($CF_4$) to give the semiconductor layer 12.

(3) Step of Forming Gate Insulating Film

Then, the gate insulating film 13 is formed from silicon oxide using TEOS gas as a raw material gas. The material for the gate insulating film 13 is not especially limited. A $SiN_x$ film, a SiON film, and the like, can be used as a material for the gate insulating film 13. The raw material gases mentioned in the base coat film-forming step are mentioned as a raw material gas for forming the SiNx film and the SiON film. The gate insulating film 13 may be a multi-layer body composed of films formed from the above-mentioned materials.

(4) Ion Doping Step

In order to adjust thresholds of the Nch-TFT and the Pch-TFT, the entire semiconductor layer 12 is doped with trivalent atoms such as boron, as impurities, by ion doping, and the like. There is no need to perform this doping if the threshold of the Pch-TFT does not need to be controlled.

(5) Impurity Implantation Step (Nch TFT Region)

In order to control a threshold of the Nch-TFT, a resist film is formed to cover a region where the Pch-TFT is to be formed through photolithography and the like. Then, a region where the Nch-TFT is to be formed of the semiconductor layer 12 is doped with trivalent atoms such as boron, by ion doping method, and the like. As a result of this channel doping, the electrical conductivity of the channel region can be increased.

(6) Step of Forming Gate Electrode

A tantalum nitride (TaN) film and a tungsten (W) film are formed in this order by sputtering. Then, a resist film is formed and patterned into a desired shape by photolithography, and then the metal multi-layer film of TaN/W is dry-etched using an etching gas composed of argon (Ar), sulfur hexafluoride ($SF_6$), carbon tetrafluoride ($CF_4$), oxygen ($O_2$), chlorine ($Cl_2$), and the like, whose amounts are adjusted. As a result, the gate electrode 14 is formed. As the metal film constituting the gate electrode 14, films formed from low-resistant metals such as aluminum (Al); and films that have a flat surface and that are formed from high-melting point metals with stable characteristics such as tantalum (Ta), molybdenum (Mo), molybdenum tungsten (MoW) are mentioned, for example. The gate electrode 14 may have a multi-layer body composed of films formed from the above-mentioned materials.

(7) Step of Forming Source-Drain Region

In order to form source-drain regions of the Nch-TFT and Pch-TFT, the Nch-TFT is doped with a high concentration of pentavalent atoms such as phosphorus and the Pch-TFT is doped with a high concentration of trivalent atoms such as boron using the gate electrode 14 as a mask, by an ion doping method and the like. If necessary, an LDD (lightly doped drain) structure may be formed. Then, the semiconductor layer 12 is subjected to a thermal activation treatment for 6 hours at about 700° C. to activate the impurity ions implanted therein. As a result, the electrical conductivity of the source-drain regions can be improved. Excimer laser may be radiated for the activation, for example.

(8) Step of Forming First Interlayer Insulating Film

Then, a $SiN_x$ film is formed as the first interlayer insulating film 117 over the entire substrate 10 by PECVD. The first interlayer insulating film 117 may be a SiON film, a TEOS film, and the like. In order to improve reliability of TFT characteristics for transient deterioration and to stabilize electrical characteristics, and the like, a thin cap film (for example, a TEOS film) with a thickness of about 50 nm may be formed in a layer lower than the first interlayer insulating film 117.

(9) Step of Forming Contact Hole

Then, a resist film is formed and patterned into a desired shape by photolithography. Then, the gate insulating film 13 and the first interlayer insulating film 117 are wet-etched using a fluorine acid etching solution. As a result, a contact hole for connecting the first source-drain electrode 115 to the source-drain region (source or drain region) of the semiconductor layer 12 is formed. Dry-etching may be used instead of the wet-etching.

(10) Step of Forming First Source-Drain Electrode

A titanium (Ti) film, an aluminum film (Al) film, and a Ti film are formed in this order by sputtering, and the like. A resist film is formed into a desired pattern by photolithography, and then, the metal multi-layer film of Ti/Al/Ti is patterned by dry etching, thereby forming the first source-drain electrode 115. The source-drain electrode 115 and one of the source and drain regions of the semiconductor layer 12 are conducted to each other through a contact hole formed in the gate insulating film 13 and the first interlayer insulating film 117. Instead of the Al film, an Al—Si alloy film and the like may be used as the metal film constituting the first source-drain electrode 115. In this Embodiment, Al is used to reduce the resistance of the wiring, but the above-mentioned materials for the gate electrode 14 (Ta, Mo, MoW, W, TaN, and the like) may be used if the wiring is formed to have a short length when a high heat resistance is needed and the resistance may be increased to some extent.

(11) Step of Forming Second Interlayer Insulating Film

Then, the second interlayer insulating film 118 is formed from silicon oxide over the entire substrate using TEOS gas as a raw material gas. The second interlayer insulating film 118 may be a SiON film, a TEOS film, and the like.

(12) Step of Forming Contact Hole

Then, a resist film is formed over the entire substrate and patterned into a desired shape by photolithography. Then, the gate insulating film 13, the first interlayer insulating film 117, and the second interlayer insulating film 118 are wet-etched using a hydrofluoric acid etching solution. As a result, a contact hole for connecting the second source-drain electrode 116a to the source-drain region (source or drain region) of the semiconductor layer 12, and a contact hole for connecting the drawing wiring 116b to the first source-drain electrode 115 are formed. Dry etching may be used instead of the wet etching. In this step, a contact hole for connecting the gate electrode 14 to the drawing wiring 116b can be formed.

(13) Step of Forming Second Source-Drain Electrode, Drawing Wiring, and Power Source Wiring A titanium (Ti) film, an aluminum (Al) film, a Ti film are formed in this order by sputtering, and the like. A resist film is formed into a desired pattern by photolithography, and then, the metal multi-layer film of Ti/Al/Ti is patterned by dry etching, thereby forming the second source-drain electrode 116a, the drawing wiring 116b, and the power source wiring 124 in the same layer. The second source-drain electrode 116a and one of the source and drain regions are conducted to each other through a contact hole formed in the gate insulating film 13, the first interlayer insulating film 117, and the second interlayer insulating film 118. Instead of the Al film, an Al—Si alloy film and the like may be used as the metal film constituting the second source-drain electrode 116a, the drawing wiring 116b, and the power source wiring 124.

(14) Step of Forming Third Interlayer Insulating Film

Then, the third interlayer insulating film 119 composed of a SiOx film is formed by PECVD using TEOS as a raw material gas. The third interlayer insulating film 119 may be a SiNx film, a SiON film, and the like.

(15) Step of Forming Contact Hole

Then, a resist film is formed over the entire substrate and patterned into a desired shape by photolithography. Then, the third interlayer insulating film 119 is wet-etched using a fluorine acid etching solution. As a result, a contact hole for connecting the drawing wiring 116b to the external connection terminal 120, and connecting the power source wiring 124 to the terminal 120. Just by forming the contact hole, the drawing wiring 116b and the power source wiring 124 can be connected to the terminal 120 because the drawing wiring 116b and the power source wiring 124 are arranged just below the external connection terminal 120. As a result, the area of the wiring region can be decreased. Dry etching may be used instead of the wet etching. In FIG. 1-3, the drawing wiring 116b is connected to the terminal 120, but the power source wiring 124 may be connected to an external connection terminal not connected to the drawing wiring 116b.

(16) Step of Forming External Connection Terminal and Pixel Electrode

The circuit board of Embodiment 1 is a circuit board for a semi-transmissive liquid crystal display device including a reflective electrode. Pixel electrodes and external connection terminals are formed together in the same production step.

On the third interlayer insulating film 119, an ITO film is formed by sputtering and the like and then patterned into a desired shape by photolithography to form the ITO layer 120a constituting the external connection terminal 120 and the ITO layer constituting a transparent electrode 131a. Then, a Mo film, an Al film, and an IZO film are successively formed by sputtering and the like, and then this multi-layer film of Mo/Al/IZO is patterned (simultaneously etched) into a desired shape by photolithography and the like to form the Mo layer 120c, the Al layer 120d, and the IZO layer 120e, each constituting the external connection terminal 120, and a multilayer film composed of the Mo layer 131c, the Al layer 131d, and the IZO layer 131e, each constituting the reflective electrode 131b. Instead of the multi-layer film of Mo/Al/IZO, a multi-layer film of Mo/Al/Mo, which includes a Mo film instead of the IZO film, a multi-layer film of Al/IZO or Al/Mo, which includes no lower Mo film, and the like, may be used. In addition, a multi-layer film of Mo/Al/Mo/IZO or Mo/IZO/Al/IZO, and the like, where a metal film (for example, a Mo film, an IZO film) is arranged between the Mo film and the Al film or between the Al film and the IZO film, may be used. As a result, the external connection terminal 120 and the pixel electrode 131 composed of the transparent electrode 131a and the reflection electrode 131b are formed. Also by the ITO layer 120a that is positioned in a layer lower than the Al layer 120d, corrosion of the Al layer 120d constituting the external connection terminal can be prevented.

By the above-mentioned method, the circuit board of Embodiment 1 is completed. Then, the sealing member 121 for attaching the circuit board to another substrate (opposite substrate) is formed on the external connection terminal 120 by screen printing, dispenser, and the like. A UV-curable resin, a thermosetting resin, and the like, may be used as the sealing member 121. The sealing member 121 is arranged on the external connection terminal 120, which leads to a reduction in area of the frame region. In order to electrically connect this board to the opposite substrate, a seal (resin) containing conductive beads therein, carbon paste, and the like, can be used. An appropriate configuration that causes no short-circuiting between the wirings that are arranged in upper layers on the circuit board is selected from these configurations. The circuit board where the seal member 121 has been formed is attached to the opposite substrate where a color filter and the like has been formed, and then, liquid crystals are injected between the circuit board and the opposite substrate. As a result, the liquid crystal display panel is completed. Further, a polarizer, a backlight unit, and the like, are mounted on the liquid crystal display panel to provide a liquid crystal display device. According to Embodiment 1, the circuit board can be used as a display device substrate, and so TFTs for switching and the like are also formed by the above-mentioned production steps. A display device including the circuit board of Embodiment 1 has a small frame region because the wiring area is significantly decreased.

Embodiment 2

FIG. 2 is a cross-sectional view schematically showing a configuration of a periphery of an external connection terminal in a circuit board in accordance with Embodiment 2.

According to the circuit board in accordance with Embodiment 2, a configuration of layers lower than a gate electrode is the same as in Embodiment 1. As shown in FIG. 2, a base coat film 11, a semiconductor layer 12, a gate insulating film 13, and a gate electrode 14 are arranged on a substrate 10. A first interlayer insulating film 217 and a second interlayer insulating film 218 are arranged on the gate electrode 14. A source-drain electrode 215 is arranged on the second interlayer insulating film 218. The source-drain electrode 215 is connected to the semiconductor layer 12 through a contact hole formed in the gate insulating film 13, the first interlayer insulating film 217, and the second interlayer insulating film 218.

On the source-drain electrode 215, a third interlayer insulating film 219 composed of a photosensitive acrylic resin film with a thickness of about 3 µm is formed, and a drawing wiring 216b and a power source wiring 224 are formed on the third interlayer insulating film 219. On the drawing wiring 216b and the power source wiring 224, a fourth interlayer insulating film 223 and an external connection terminal 220 are arranged in this order. Through a contact hole 225 formed in the fourth interlayer insulating film 223, the external connection terminal 220 is connected to the drawing wiring 216b. Thus, in layers upper than the source-drain electrode 215, the third interlayer insulating film 219 (corresponding to the above-mentioned first interlayer film), the drawing wirings 216b and the power source wiring 224, and the fourth interlayer insulating film 223 (corresponding to the above-mentioned second interlayer film) are stacked in this order. The fourth interlayer insulating film 223 is composed of a photosensitive acrylic resin film with a thickness of about 2 to 3 μm. The external connection terminal 220 is composed of an ITO layer 220a, a Mo layer 220c, an Al layer 220d, and an IZO layer 220e, similarly to Embodiment 1. The sealing member 221 is arranged on the external connection terminal 220. The third interlayer insulating film 219 and the fourth interlayer insulating film 223 are composed of photosensitive acrylic resin films to flatten a region where the drawing wiring 216b or the external connection terminal 220 is to be arranged, thereby preventing disconnection of the wiring 216b or the terminal 220, which might be caused by an uneven surface of lower layers. The external connection terminal 220 is connected to the drawing wiring 216b in this Embodiment. The power source wiring 224 may be connected to an external connection terminal not directly connected to the drawing wiring 216b. The configuration of a pixel electrode of Embodiment 2 is the same as in Embodiment 1.

Embodiment 3

FIG. 3 is a cross-sectional view schematically showing a configuration of a periphery of an external connection terminal in a circuit board in accordance with Embodiment 3. According to the circuit board in accordance with Embodiment 3, a configuration of layers lower than a source-drain electrode 315 is the same as in Embodiment 2. As shown in FIG. 3, a base coat film 11, a semiconductor layer 12, a gate insulating film 13, and a gate electrode 14, a first interlayer insulating film 317, a second interlayer insulating film 318, and the source-drain electrode 315 are arranged on a substrate 10 in this order. A third interlayer insulating film 319 composed of silicon nitride is formed on the source-drain electrode 315. A drawing wiring 316b and a power source wiring 324 are formed on the third interlayer insulating film 319. On the drawing wiring 316b and the power source wiring 324, a fourth interlayer insulating film 323 and an external connection terminal 320 are formed in this order. Through a contact hole 325 formed in the fourth interlayer insulating film 323, the external connection terminal 320 is connected to the drawing wiring 316b.

The external connection terminal 320 is composed of an ITO layer 320a, a Mo layer 320c, an Al layer 320d, and an IZO layer 320e, similarly to Embodiment 1. The sealing member 321 is arranged on the external connection terminal 320. The third interlayer insulating film 319 is an inorganic interlayer film formed from silicon nitride, which permits easy dry etching. So the drawing wiring 316b and the power source wiring 324 are finely processed. The external connection terminal 320 is connected to the drawing wiring 316b. The power source wiring 324 may be connected to an external connection terminal not directly connected to the drawing wiring 316b. The power source wiring 324 may be arranged on the second interlayer insulating film 318, that is, the power source wiring 324 may be arranged in a layer different from the drawing wirings 316b to overlap with each other. Further, the following configurations may be mentioned. The source-drain electrode 315 (circuit constituting-wiring) is arranged on the first interlayer insulating film 317; the power source wiring 324 is arranged on the second interlayer insulating film 318; the drawing wiring 316b is arranged on the third interlayer insulating film 319; and the drawing wiring 316b, the power source wiring 324, and the source-drain electrode 315 overlap with one another. Thus, in layers upper than the source-drain electrode 315 (circuit-constituting wiring), the second interlayer insulating film 318 (corresponding to the above-mentioned first interlayer film), the power source wiring 324, the third interlayer insulating film 319 (corresponding to the above-mentioned second interlayer film), the drawing wiring 316b, and the fourth interlayer insulating film 323 (corresponding to the above-mentioned third interlayer film) may be stacked in this order. Alternatively, a layer of the power source wiring 324 and a layer of the drawing wiring 316b may be switched, and specifically, the second interlayer insulating film 318, the drawing wiring 316b, the third interlayer insulating film 319, the power source wiring 324, and the fourth interlayer insulating film 323 may be stacked in this order in layers upper than the source-drain electrode 315 (circuit-constituting wiring). The configuration of a pixel electrode of Embodiment 3 is the same as in Embodiment 1.

Embodiment 4

FIG. 4-1 is a cross-sectional view schematically showing a configuration of a periphery of an external connection terminal in a circuit board in accordance with Embodiment 4. FIG. 4-2 is a plan view schematically showing the configuration of the periphery of the external connection terminal in the circuit board in accordance with Embodiment 4.

According to the circuit board in accordance with Embodiment 4, a configuration of layers lower than a third interlayer insulating film 419 is the same as in Embodiment 1. As shown in FIG. 4-1, a base coat film 11; a semiconductor layer 12; a gate insulating film 13 and a gate electrode 14; a first interlayer insulating film 417; a first source-drain electrode 415; a second interlayer insulating film 418; a second source-drain electrode 416a, a drawing wiring 416b, and a power source wiring 424; and a third interlayer insulating film 419 are arranged in this order on a substrate 10.

An external connection terminal 420 is formed on the third interlayer insulating film 419. A sealing member 421 is arranged on the external connection terminal 420. The external connection terminal 420 is composed of an ITO layer 420a, a Mo layer 420c, an Al layer 420d, and an IZO layer 420e. The IZO layer 420e is arranged to cover upper and side surfaces (surfaces not in contact with the Mo layer 420c) of the Al layer 420d. This can prevent Al, which is easily corroded, from being exposed to air. So the corrosion of the Al layer 420d can be prevented. According to the external connection terminal 420, as shown in FIG. 4-2, the IZO layer 420e is formed to cover the Mo layer 420c and the Al layer 420d formed on the ITO layer 420a. The terminal 420 is connected to the drawing wiring 416b that is positioned in a layer lower than the terminal 420 through a contact hole 425. Similarly to Embodiment 1, a pixel electrode 431 has the following configuration, as shown in FIG. 4-3: on a transparent electrode 431a composed of an ITO layer, a reflective electrode 431b composed of a MO layer 431c, an Al layer 431d, and an IZO layer 431e is stacked. The external connection terminal 420 is connected to the drawing wiring 416b. The power source wiring 424 may be connected to an external connection terminal not directly connected to the drawing wiring 416b.

Embodiment 5

FIG. 5-1 is a cross-sectional view schematically showing a configuration of a periphery of an external connection terminal in a circuit board in accordance with Embodiment 5. FIG. 5-2 is a plan view schematically showing the configuration of the periphery of the external connection terminal in the circuit board in accordance with Embodiment 5. FIG. 5-3 is a cross-sectional view schematically showing a configuration of a pixel electrode in the circuit board in accordance with Embodiment 5.

According to the circuit board in accordance with Embodiment 5, a configuration of layers lower than a third interlayer insulating film 519 is the same as in Embodiment 1. As shown in FIG. 5-1, a base coat film 11; a semiconductor layer 12; a gate insulating film 13; a gate electrode 14; a first interlayer insulating film 517; a first source-drain electrode 515; a second interlayer insulating film 518; a second source-drain electrode 516a, a drawing wiring 516b, and a power source wiring 524; and the third interlayer insulating film 519 are arranged in this order on a substrate 10. An external connection terminal 520 is arranged on the third insulating film 519. A sealing member 521 is arranged on the external connection terminal 520. The power source wiring 524 and the drawing wiring 516b are arranged to overlap with the first source-drain electrode 515. The sealing member 521 is arranged on the outer side of a region where the external connection terminal 520 is connected to the power source wiring 524 through a contact hole 525 formed in the third interlayer insulating film 519. The external connection terminal 520 is composed of a Mo layer 520c, an Al layer 520d, and an IZO layer 520e. As shown in FIG. 5-2, the Mo layer 520c, the Al layer 520d, and the IZO layer 520e each constituting the external connection terminal 520 are formed in such a way that ends thereof are aligned. The external connection terminal 520 and the power source wiring 524 are connected to each other through a contact hole 525 formed on the inner side of the sealing member 521. As shown in FIG. 5-3, the pixel electrode 531 includes no ITO layer, differently from Embodiment 1, and a Mo layer 531c and an Al layer 531d are stacked in this order to constitute a reflective electrode 531b. An IZO layer arranged in a layer upper than the reflective electrode 531b functions also as a transparent electrode 531a and as a layer for preventing corrosion of the Al layer 531d. In this case, the step of forming the ITO layer can be omitted, and compared with Embodiment 1, the productivity can be improved. The external connection terminal 520 is connected to the power source wiring 524 in this embodiment, and the drawing wiring 516b may be connected to an external connection terminal not directly connected to the power source wiring 524.

Embodiment 6

FIG. 6-1 is a cross-sectional view schematically showing a configuration of a periphery of an external connection terminal in a circuit board in accordance with Embodiment 6. FIG. 6-2 is a plan view schematically showing the configuration of the periphery of the external connection terminal in the circuit board in accordance with Embodiment 6. FIG. 6-3 is a cross-sectional view schematically showing a configuration of a pixel electrode in the circuit board in accordance with Embodiment 6. FIG. 6-4 is a plan view schematically showing the configuration of the pixel electrode in the circuit board in accordance with Embodiment 6.

According to the circuit board in accordance with Embodiment 6, a configuration of layers lower than a third interlayer insulating film 619 is the same as in Embodiment 1. As shown in FIG. 6-1, a base coat film 11; a semiconductor layer 12; a gate insulating film 13; a gate electrode 14; a first interlayer insulating film 617; a first source-drain electrode 615; a second interlayer insulating film 618; a second source-drain electrode 616a, drawing wirings 616b, and the power source wiring 624; and the third interlayer insulating film 619 are arranged in this order on a substrate 10. An external connection terminal 620 is arranged on the third interlayer insulating film 619. A sealing member 621 is arranged on the external connection terminal 620. The external connection terminal 620 is composed of a Mo layer 620c, an Al layer 620d, and an ITO layer 620a.

As shown in FIG. 6-2, the Mo layer 620c and the Al layer 620d each constituting the external connection terminal 620 are formed in such a way that ends thereof are aligned. The ITO layer 620a is arranged in a layer upper than the Al layer 620d to cover it. The external connection terminal 620 is connected to the drawing wiring 616b through a contact hole 625. As shown in FIG. 6-3, as a pixel electrode 631, a Mo layer 631c and an Al layer 631d are stacked in this order, and an ITO layer 631a is arranged in a layer upper than the Al layer 631d to cover it. The ITO layer 631a functions also as a transparent electrode. In this case, the number of steps of forming the external connection terminal 620 can be decreased by one, and so the productivity can be improved compared with Embodiments 1 to 4. The ITO layer 631a covers the Al layer 631d, and the ITO layer 620a covers the Al layer 620d. So an electrolytic corrosion of the Al layers 631d and 620d is not generated at the time of etching. As shown in the schematic plan view of FIG. 6-4, the Al layer 631d is covered by the ITO layer 631a in the pixel electrode 631. The external connection terminal 620 is connected to the drawing wiring 616b. The power source wiring 624 may be connected to an external connection terminal not directly connected to the drawing wiring 616b. Further, an IZO layer may be arranged in a layer lower than the Mo layer 631c, and thus, the external connection terminal 620 may be composed of the IZO layer, the MO layer 620c, the Al layer 620d, and the IZO layer 620a, stacked in this order from the substrate 10 side, and along with this, the pixel electrode 631 may be composed of the IZO layer, the Mo layer 631c, and the Al layer 631d stacked in this order from the substrate 10 side.

Embodiment 7

FIG. 7-1 is a cross-sectional view schematically showing a periphery of an external connection terminal in a circuit board in accordance with Embodiment 7. FIG. 7-2 is a plan view schematically showing the configuration of the periphery of the external connection terminal in the circuit board in accordance with Embodiment 7. FIG. 7-3 is a cross-sectional view schematically showing a configuration of a pixel electrode in the circuit board in accordance with Embodiment 7.

According to the circuit board in accordance with Embodiment 7, a configuration of layers lower than a third interlayer insulating film 719 is the same as in Embodiment 1. As shown in FIG. 7-1, a base coat film 11; a semiconductor layer 12; a gate insulating film 13; a gate electrode 14; a first interlayer insulating film 717; a first source-drain electrode 715; a second interlayer insulating film 718; a second source-drain electrode 716a, drawing wirings 716b, and a power source wiring 724; and the third interlayer insulating film 719 are arranged in this order on a substrate 10.

An external connection terminal 720 is arranged on the third interlayer insulating film 719. An insulating film 722 composed of a photosensitive acrylic resin film is arranged on the external connection terminal 720, and thereon, a sealing member 721 is arranged. The sealing member 721 is arranged on the outer side of a region where the external connection terminal 720 is connected to the power source wiring 724 through a contact hole 725 formed in the third interlayer insulating film 719. The external connection terminal 720 is composed of an ITO layer 720a, a MO layer 720c, an Al layer 720d, and an IZO layer 720e. As shown in FIG. 7-2, the Mo layer 720c, the Al layer 720d, and the IZO layer 720e each constituting the external connection terminal 720 are formed in such a way that ends thereof are aligned. The external connection terminal 720 is connected to the power source wiring 724 positioned in a layer lower than the terminal 720 through the contact hole 725. As shown in FIG. 7-3, a transparent electrode 731a made of ITO and a reflective electrode 731b composed of a Mo layer 731c, an Al layer 731d, and an IZO layer 731e, are stacked in this order. An insulating film 722 is formed between the sealing member 721 and the external connection terminal 720. So disconnection defects of the external connection terminal 720 by pressure when the substrates are attached can be prevented. If the sealing member 721 contains conductive beads in order to electrically conduct the circuit board to the opposite substrate, short-circuiting between adjacent external connection terminals 720 can be prevented. The sealing member 721 is connected to the external connection terminal 720 through the insulating film 722, and adherence of the sealing member 721 is improved. The external connection terminal 720 is connected to the power source wiring 724, and the drawing wiring 716b may be connected to an external connection terminal not directly connected to the power source wiring 725.

Embodiment 8

FIG. 8-1 is a cross-sectional view schematically showing a configuration of a periphery of an external connection terminal in a circuit board in accordance with Embodiment 8. FIG. 8-2 is a plan view schematically showing the configuration of the periphery of the external connection terminal in the circuit board in accordance with Embodiment 8.

According to the circuit board in accordance with Embodiment 8, a configuration of layers lower than a third interlayer insulating film 819 is the same as in Embodiment 1. As shown in FIG. 8-1, a base coat film 11; a semiconductor layer 12; a gate insulating film 13; a gate electrode 14; a first interlayer insulating film 817; a first source-drain electrode 815; a second interlayer insulating film 818; a second source-drain electrode 816a, the drawing wiring 816b, and the power source wiring 824; and the third interlayer insulating film 819 are arranged in this order on a substrate 10. An external connection terminal 820 and a sealing member 821 are arranged on the third interlayer insulating film 819. The sealing member 821 is arranged on the inner side of the external connection terminal 820. The external connection terminal 820 is composed of an ITO layer 820a, a Mo layer 820c, an Al layer 820d, and an IZO layer 820e.

As shown in FIG. 8-2, a Mo layer 820c, an Al layer 820d, and an IZO layer 820e each constituting the external connection terminal 820 are formed in such a way that ends thereof are aligned. The external connection terminal 820 is connected to the drawing wiring 816b positioned in a layer lower than the terminal 820 through a contact hole 825. In this case, the sealing member 821 is directly arranged on the third interlayer insulating film 819, and so adherence of the sealing member 821 is improved. The external connection terminal 820 is connected to the drawing wiring 816b in this embodiment, and the power source wiring 824 may be connected to an external connection terminal not directly connected to the drawing wiring 816b.

The present invention is mentioned in detail with reference to Embodiments above. The Embodiments may be appropriately combined.

Comparative Embodiment

FIG. 9-1 is a cross-sectional view schematically showing a configuration of a periphery of an external connection terminal in a circuit board in accordance with Comparative Embodiment. FIG. 9-2 is a plan view schematically showing the configuration of the periphery of the external connection terminal in the circuit board in accordance with Comparative Embodiment. According to the circuit board in accordance with Comparative Embodiment, the sealing member formed in the circuit board separates a panel region into a panel-inside region and a panel-outside region. (a panel region is separated into a panel-inside region and a panel-outside region with respect to the sealing member formed in the circuit board).

According to the circuit board of Comparative Embodiment, as shown in FIG. 9-1, a base coat film 11, a semiconductor layer 12, and a gate insulating film 13 are stacked in this order on a substrate 10. An external connection terminal 920a, a first interlayer insulating film 917, and a second interlayer insulating film 918 are formed in this order on the gate insulating film 13. The external connection terminal 920a is formed over the panel-inside and panel-outside regions. The connection wiring 916 is connected to an end portion of the external connection terminal 920a on the panel-inside region side through a contact hole that penetrates the first and second interlayer insulating films 917 and 918. The external connection wiring 920b is connected to an end portion of the external connection terminal 920a on the panel-outside region side through a contact hole that penetrates the first and second interlayer insulating films 917 and 918. The external connection terminal 920b is made of aluminum. The external connection terminal 920c covers the external connection terminal 920b to prevent corrosion thereof. A third interlayer insulating film 919 is arranged on the connection wiring 916 and the second interlayer insulating film 918. The third interlayer insulating film 919 is not arranged in a layer upper than the external connection terminals 920a to 920c. A sealing member 921 is arranged on the third interlayer insulating film 919 at the boundary between the panel-inside and panel-outside regions.

In Comparative Embodiment, a region where the connection wiring 916 is arranged is positioned on the panel-inside region side of the sealing member 921; the external connection terminals 920b and 920c are arranged on the panel-outside region side of the sealing member 921; and the external connection terminal 920a connects the panel-inside region to the panel-outside region. In this case, as shown in FIG. 9-2, the connection terminal 916 overlaps with the end portion of the external connection terminal 920a to be connected thereto through a contact hole 925. This is because a metal film that is formed together with the gate electrode and the like arranged just above the gate insulating film in the same film-forming step is used as the external connection terminal 920a. The external connection terminal region and the connection wiring region are individually formed. As a result, the wiring area can not be effectively decreased.

The present application claims priority to Patent Application No. 2007-196350 filed in Japan on Jul. 27, 2007 under the Paris Convention and provisions of national law in a designated State, the entire contents of which are hereby incorporated by reference.

BRIEF DESCRIPTION OF DRAWINGS

FIG. 1-2 is a plan view schematically showing an arrangement relationship between an external connection terminal and a drawing wiring in the circuit board in accordance with Embodiment 1.

FIG. 1-3 is a cross-sectional view schematically showing a configuration of a periphery of the external connection terminal in the circuit board in accordance with Embodiment 1.

FIG. 1-4 is a plan view schematically showing the configuration of the periphery of the external connection terminal in the circuit board in accordance with Embodiment 1.

FIG. 1-5 is a cross-sectional view schematically showing a configuration of a pixel electrode in the circuit board in accordance with Embodiment 1.

FIG. 2 is a cross-sectional view schematically showing a configuration of a periphery of an external connection terminal in a circuit board in accordance with Embodiment 2.

FIG. 3 is a cross-sectional view schematically showing a configuration of a periphery of an external connection terminal in a circuit board in accordance with Embodiment 3.

FIG. 4-1 is a cross-sectional view schematically showing a configuration of a periphery of an external connection terminal in a circuit board in accordance with Embodiment 4.

FIG. 4-2 is a plan view schematically showing the configuration of the periphery of the external connection terminal in the circuit board in accordance with Embodiment 4.

FIG. 4-3 is a cross-sectional view schematically showing a configuration of a pixel electrode in the circuit board in accordance with Embodiment 4.

FIG. 5-1 is a cross-sectional view schematically showing a configuration of a periphery of an external connection terminal in a circuit board in accordance with Embodiment 5.

FIG. 5-2 is a plan view schematically showing the configuration of the periphery of the external connection terminal in the circuit board in accordance with Embodiment 5.

FIG. 5-3 is a cross-sectional view schematically showing a configuration of a pixel electrode in the circuit board in accordance with Embodiment 5.

FIG. 6-1 is a cross-sectional view schematically showing a configuration of a periphery of an external connection terminal in a circuit board in accordance with Embodiment 6.

FIG. 6-2 is a plan view schematically showing the configuration of the periphery of the external connection terminal in the circuit board in accordance with Embodiment 6.

FIG. 6-3 is a cross-sectional view schematically showing a configuration of a pixel electrode in the circuit board in accordance with Embodiment 6.

FIG. 6-4 is a plan view schematically showing the configuration of the pixel electrode in the circuit board in accordance with Embodiment 6.

FIG. 7-1 is a cross-sectional view schematically showing a configuration of a periphery of an external connection terminal in a circuit board in accordance with Embodiment 7.

FIG. 7-2 is a plan view schematically showing the configuration of the periphery of the external connection terminal in the circuit board in accordance with Embodiment 7.

FIG. 7-3 is a cross-sectional view schematically showing a configuration of a pixel electrode in the circuit board in accordance with Embodiment 7.

FIG. 8-1 is a cross-sectional view schematically showing a configuration of a periphery of an external connection terminal in a circuit board in accordance with Embodiment 8.

FIG. 8-2 is a plan view schematically showing the configuration of the periphery of the external connection terminal in the circuit board in accordance with Embodiment 8.

FIG. 9-1 is a cross-sectional view schematically showing a configuration of a periphery of an external connection terminal in a circuit board in accordance with Comparative Embodiment.

FIG. 9-2 is a plan view schematically showing an arrangement relationship between an external connection terminal and a drawing wiring of a circuit board in accordance with Comparative Embodiment.

FIG. 11(a) is a plan view schematically showing that an end portion of an external connection terminal is connected to a connection wiring. FIG. 11(b) is a plan view schematically showing that a connection wiring is connected to an external connection terminal, and the connection wiring is arranged to overlap with another external connection terminal. FIG. 11(c) is a plan view schematically showing that two connection wirings formed in the same layer are connected to one external connection terminal. FIG. 11(d) is a plan view schematically showing that connection wirings formed in different layers are connected to one external connection terminal.

EXPLANATION OF NUMERALS AND SYMBOLS

Figure 1:
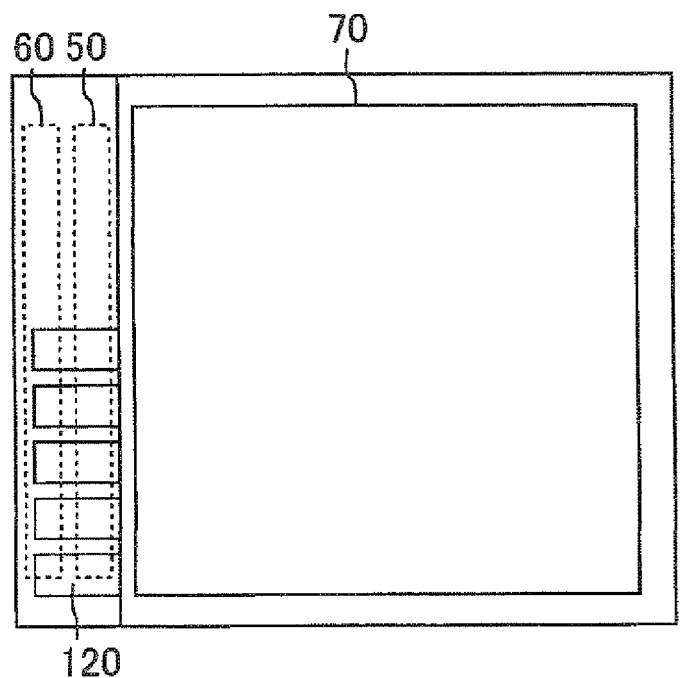
FIG. 1-1 is a plan view schematically showing a configuration of a circuit board in accordance with Embodiment 1.
Figures 1, 2:
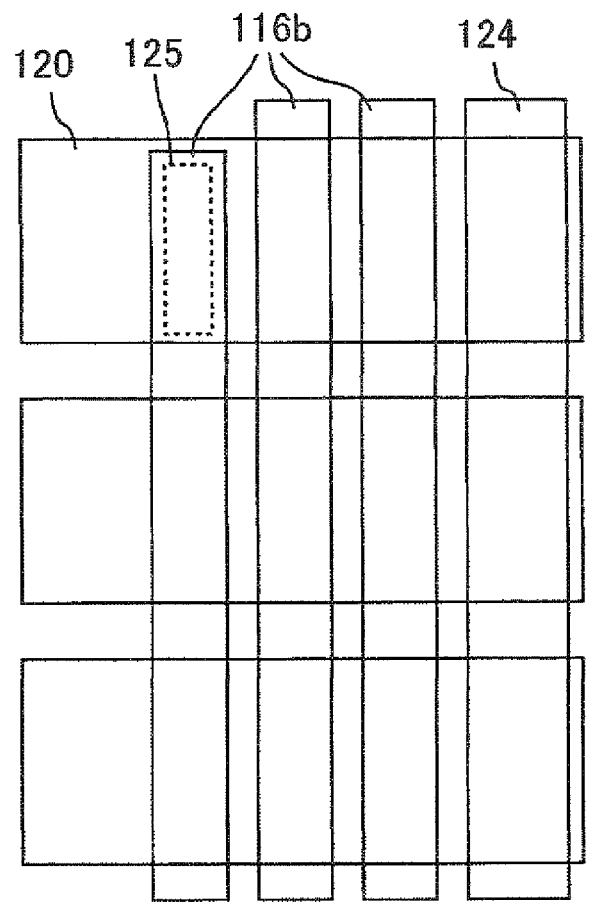
Figures 1, 2, 3:
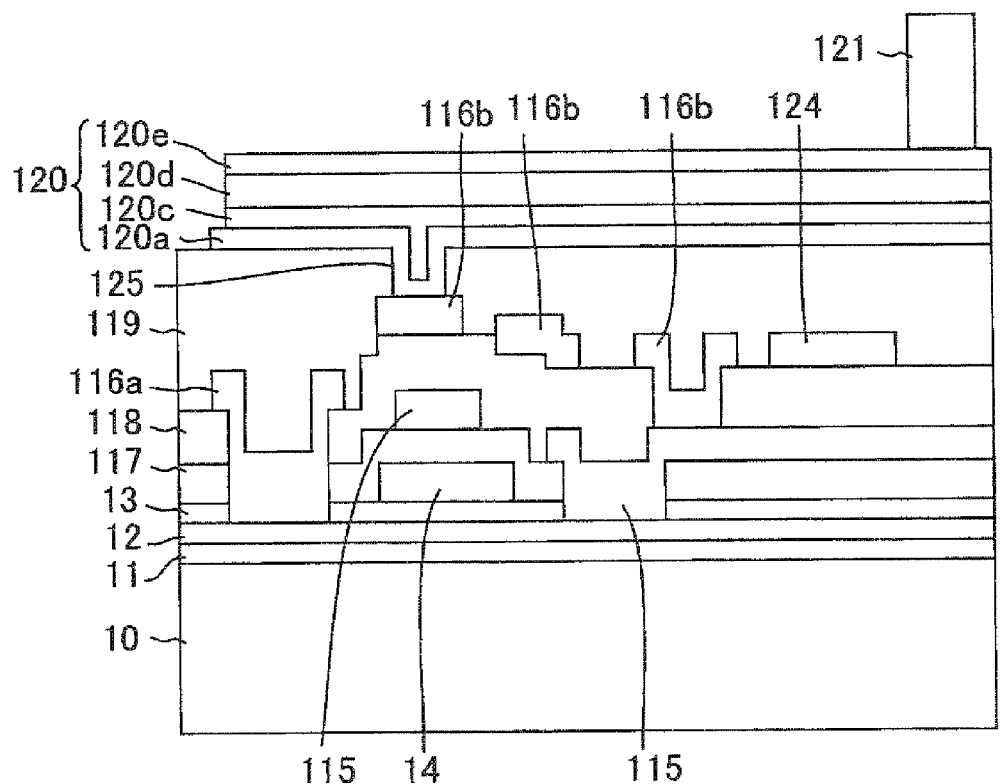
Figures 1, 2, 3, 4:
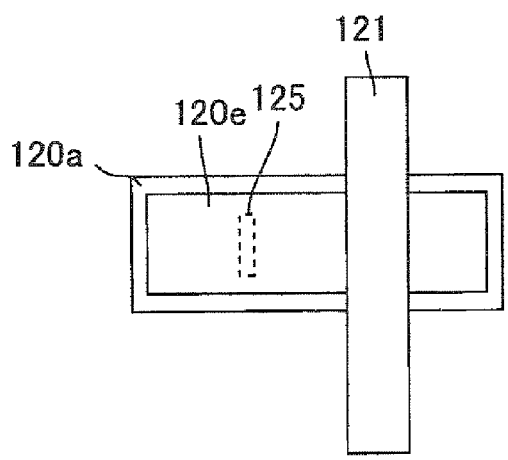
Figures 1, 2, 3, 4, 5:
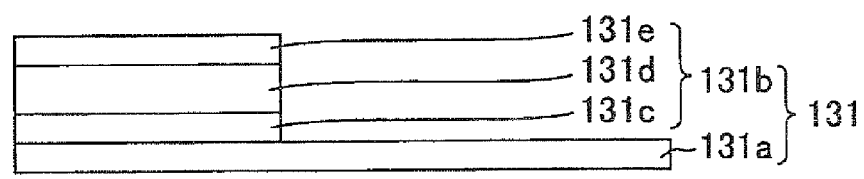
Figure 2:
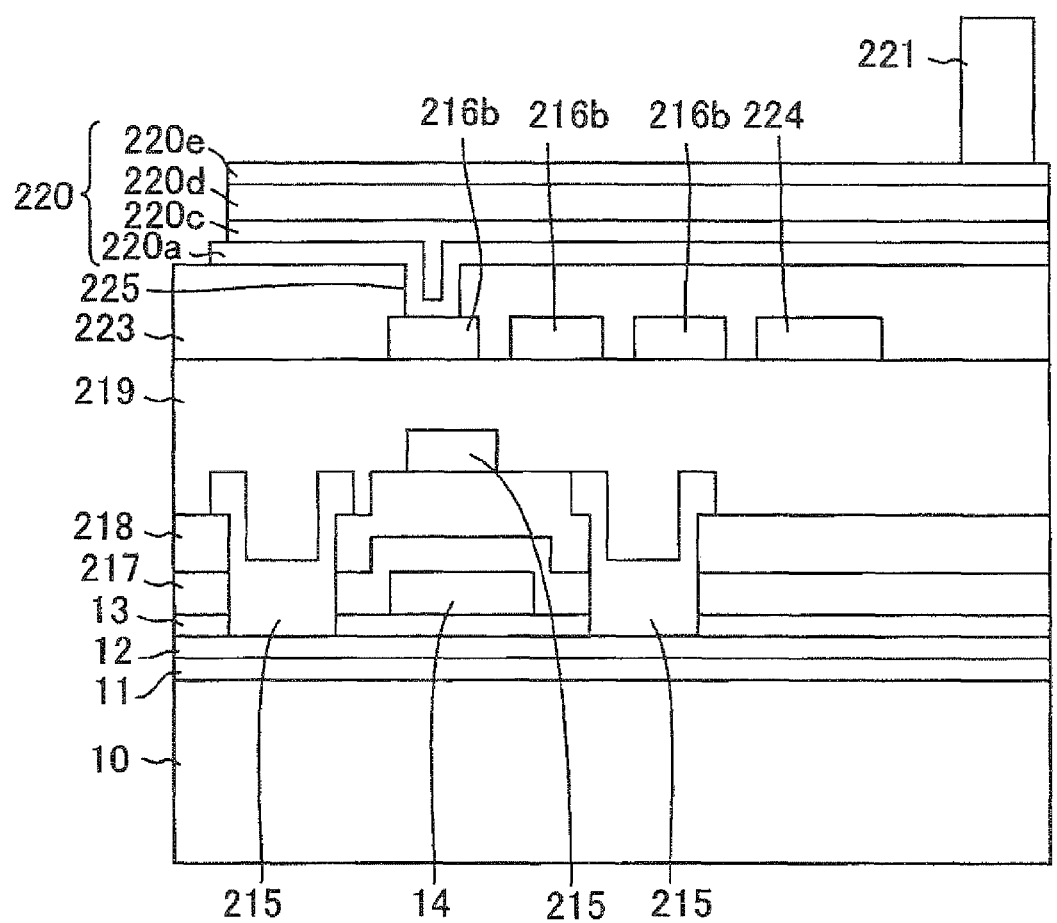
Figure 3:
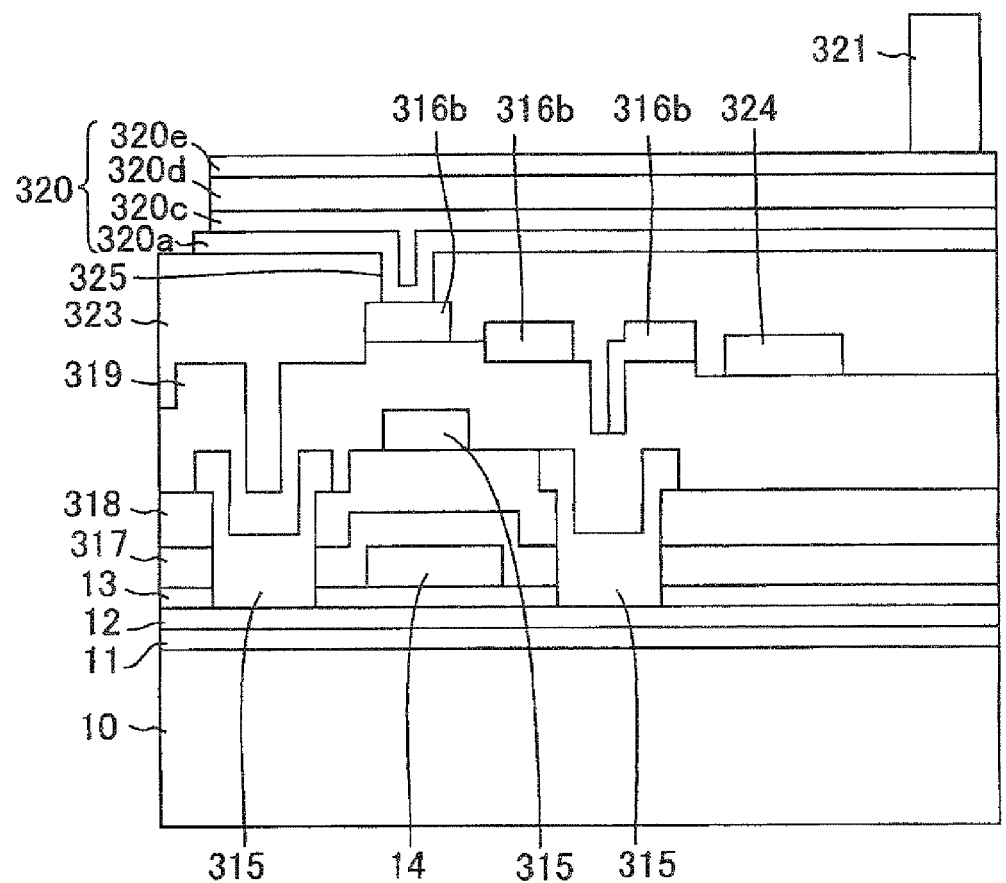
Figures 1, 4:
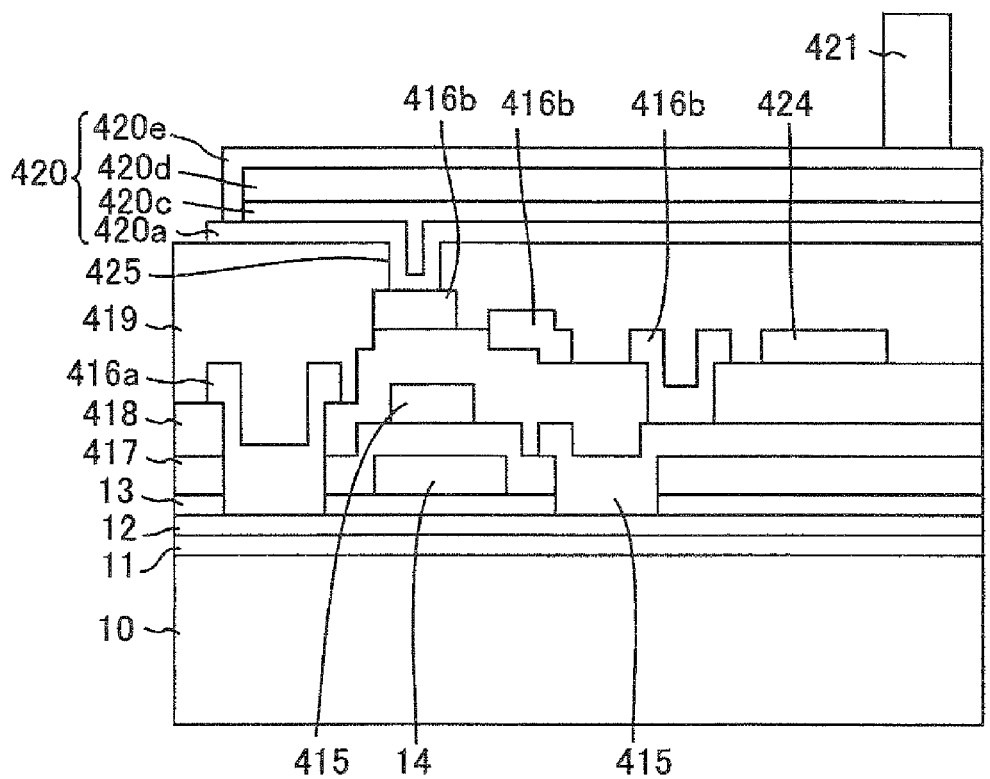
Figures 2, 4:
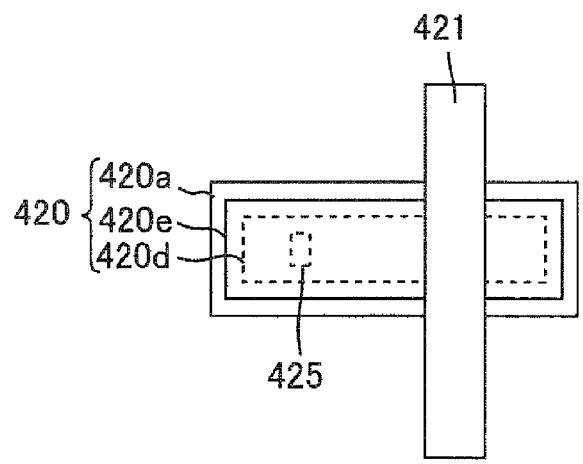
Figures 3, 4:
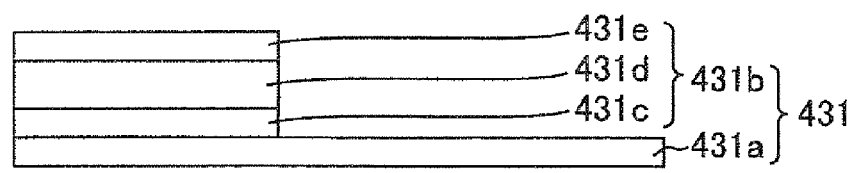
Figures 1, 5:
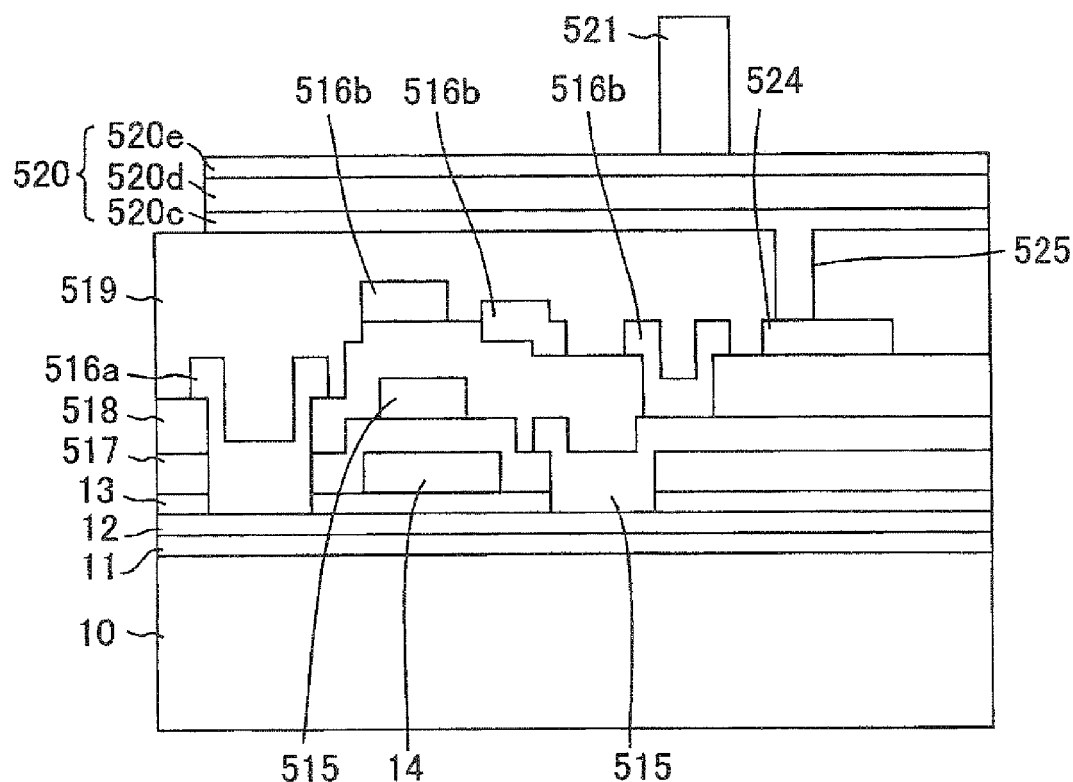
Figures 2, 5:
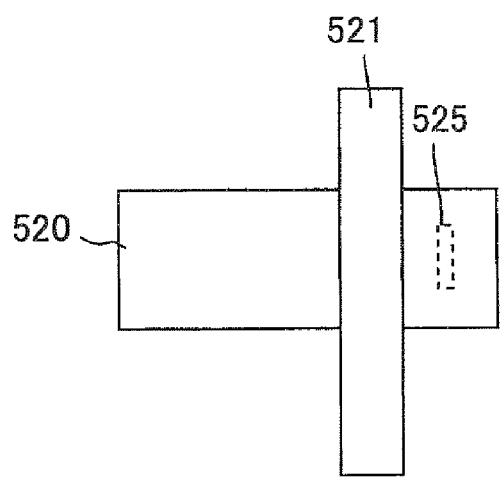
Figures 3, 5:
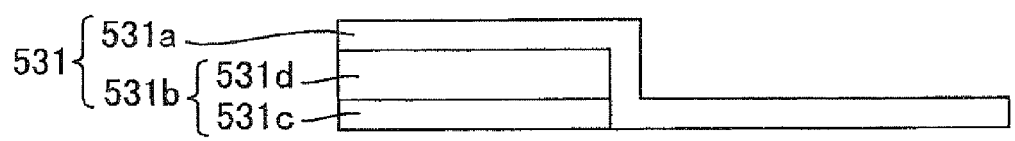
Figures 1, 6:
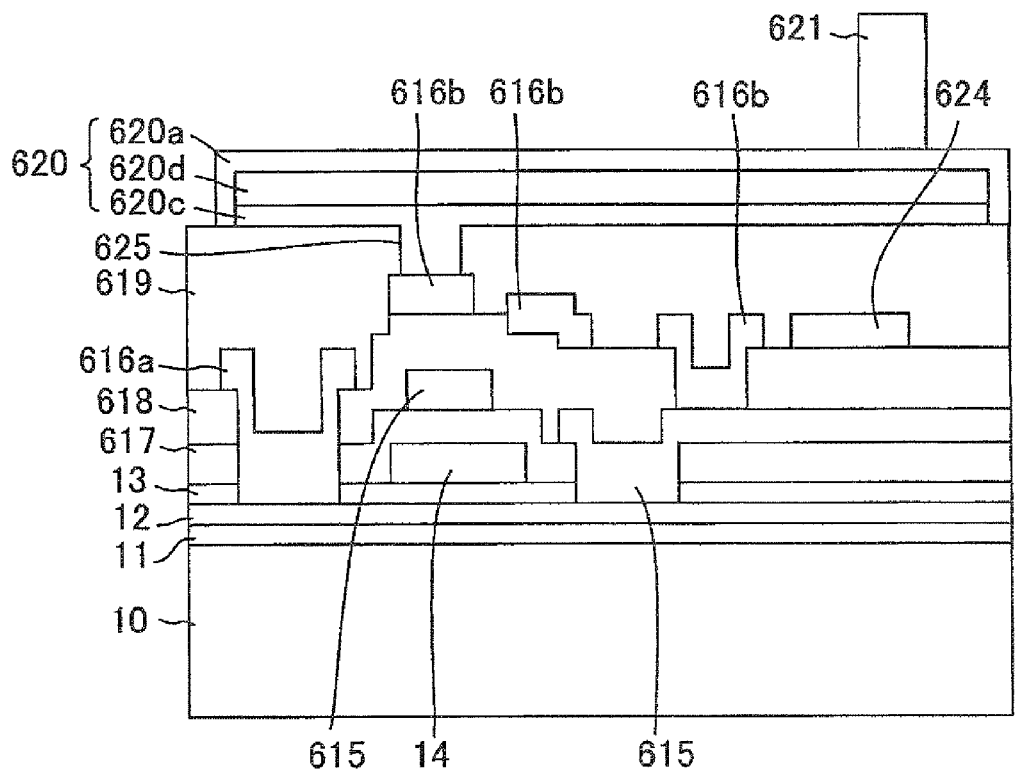
Figures 2, 6:
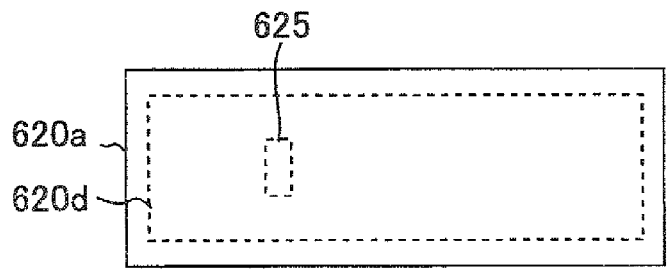
Figures 3, 6:
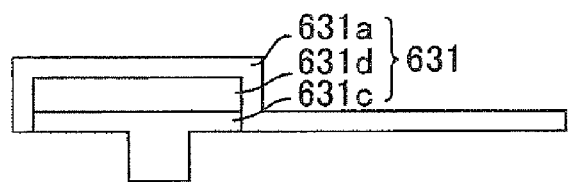
Figures 4, 6:
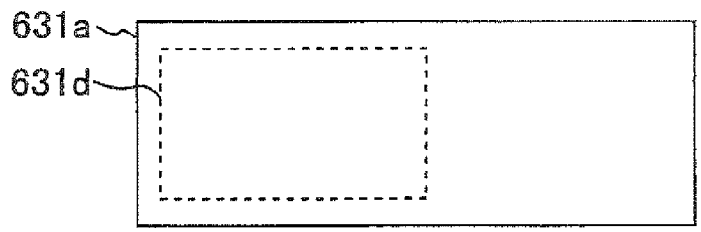
Figures 1, 7:
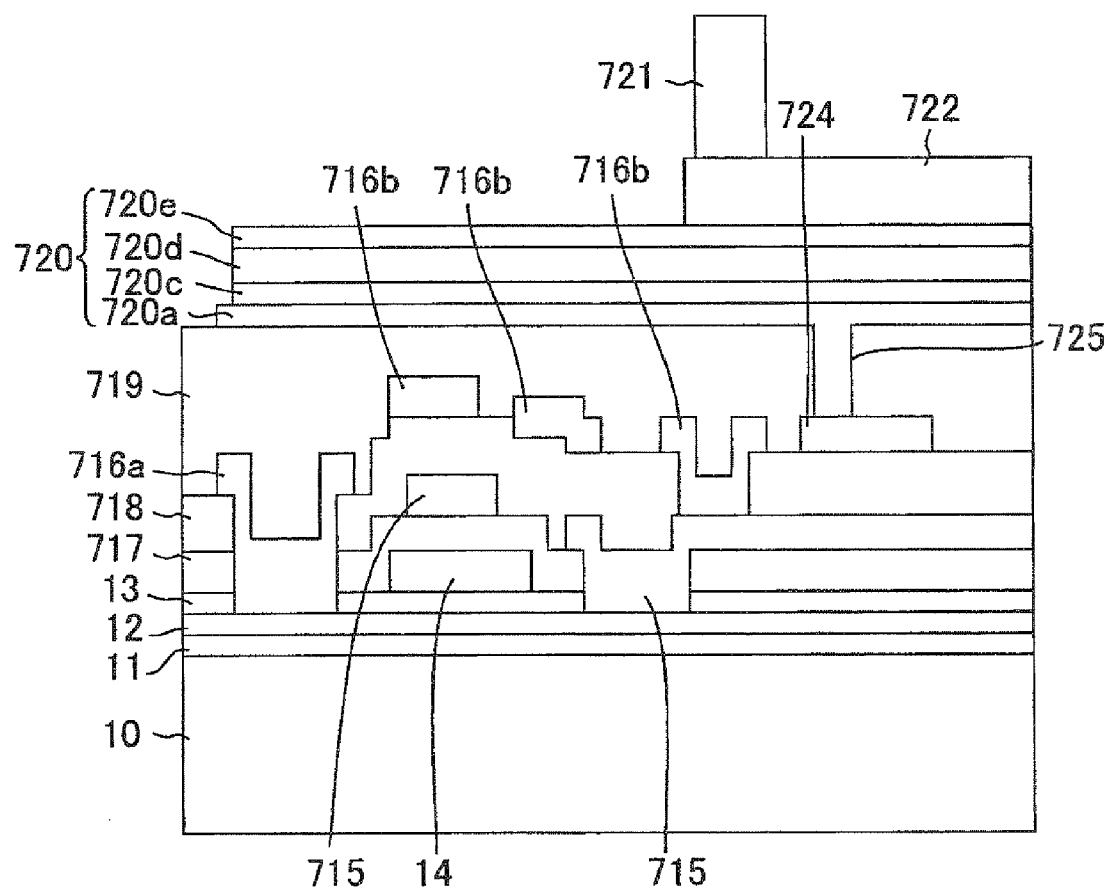
Figures 2, 7:
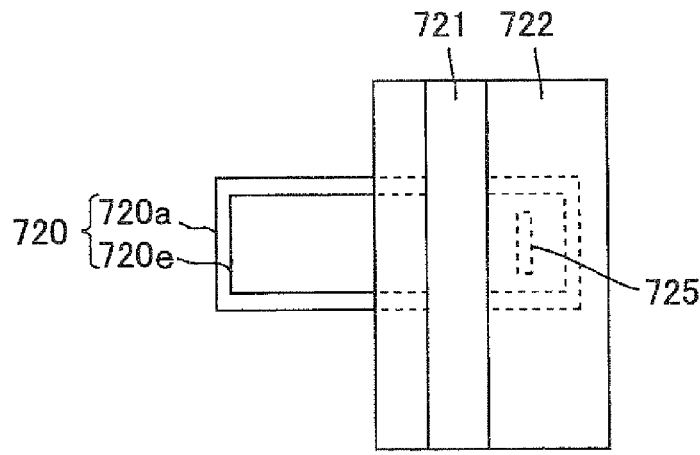
Figures 3, 7:
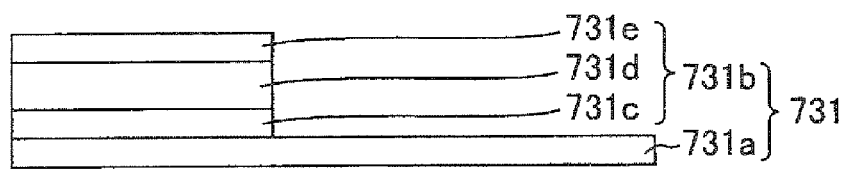
Figures 1, 8:
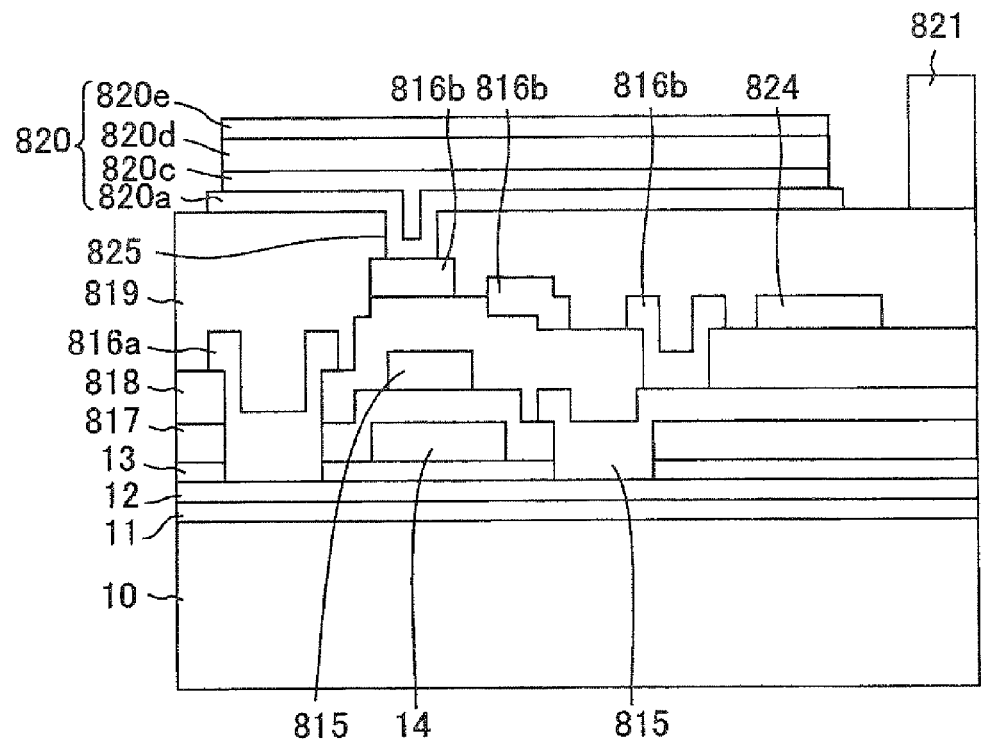
Figures 2, 8:
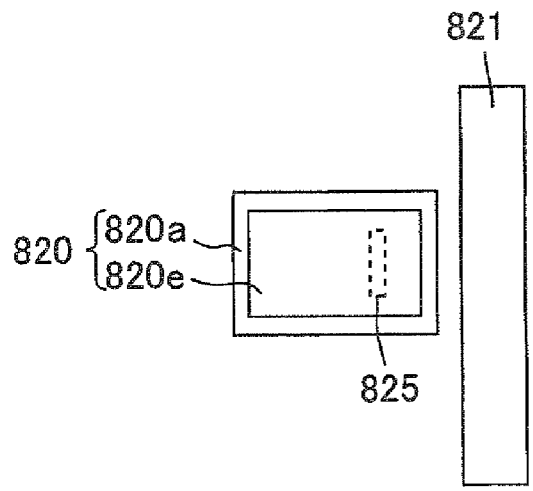
Figures 1, 9:
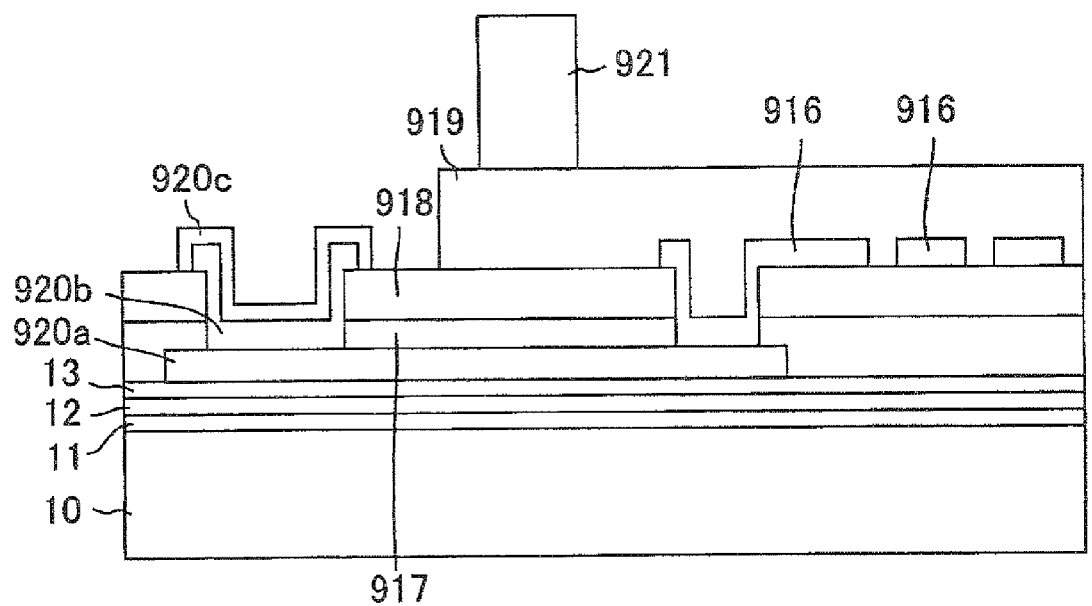
Figures 2, 9:
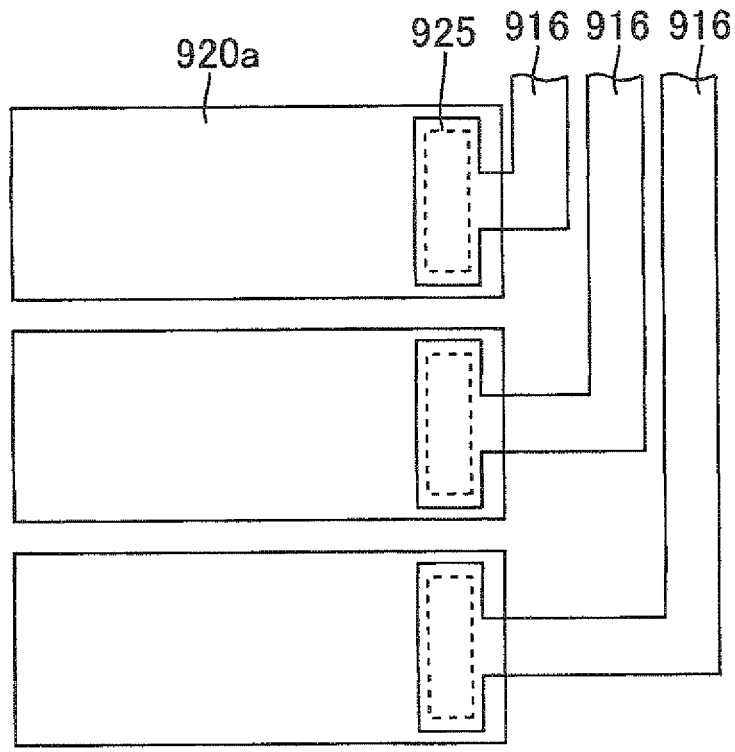
Figure 10:
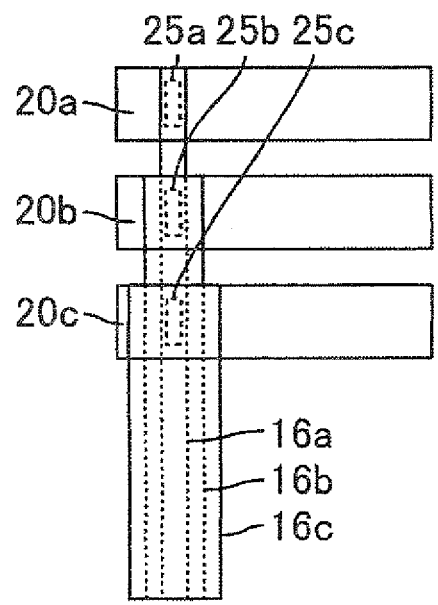
FIG. 10 is a plan view schematically showing a configuration of a circuit board in accordance with the present invention and showing an embodiment where external connection terminals and connection wirings are connected to each other when the connection wirings are arranged in different layers to overlap with one another.
Figure 11:
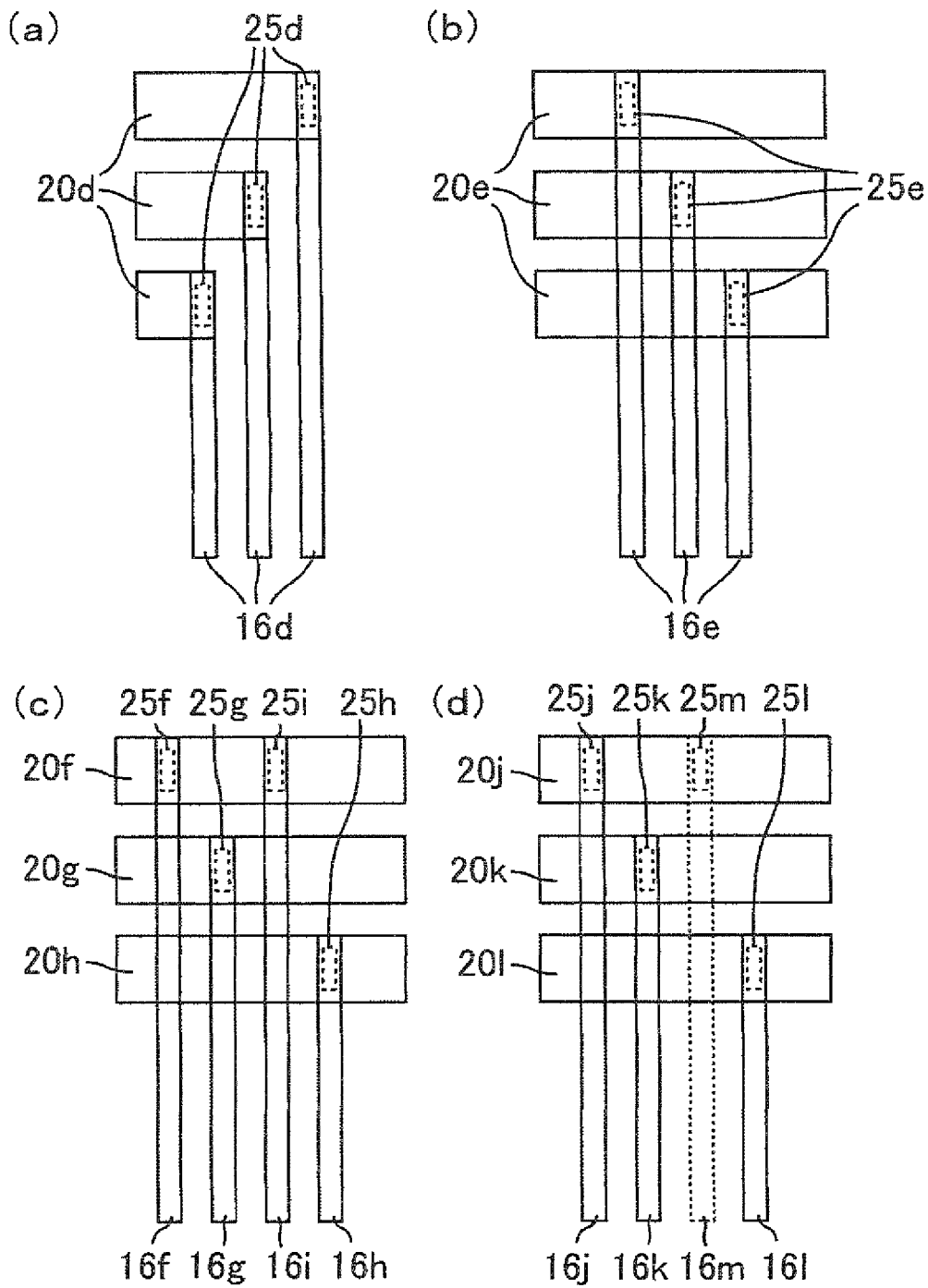
FIG. 11 is a plan view schematically showing a configuration of a circuit board in accordance with the present invention and showing an embodiment where external connection terminals and connection wirings are connected to each other.

10: Glass substrate
11: Base coat film
12: Semiconductor layer
13: Gate insulating film
14: Gate electrode 16a, 16b, 16c, 16d, 16e, 16f, 16g, 16h, 16i, 16j, 16k, 16l, 16m,
916: Connection wiring
20a, 20b, 20c, 20d, 20e, 20f, 20g, 20h, 20j, 20k, 16l, 120, 220, 320, 420, 520, 620, 720, 820, 920a, 920b, 920c: External connection terminal
25a, 25b, 25c, 25d, 25e, 25f, 25g, 25h, 25i, 25j, 25k, 25l, 25m, 125, 225, 325, 425, 525, 625, 725, 825, 925: Contact hole
50: Circuit region
60: Drawing wiring region
70: Display region
115, 415, 515, 615, 715, 815: First source-drain electrode
116a, 416a, 516a, 616a, 716a, 816a: Second source-drain electrode
116b, 216b, 316b, 416b, 516b, 616b, 716b, 816b, 916: Drawing wiring
117, 217, 317, 417, 517, 617, 717, 817, 917: First interlayer insulating film
118, 218, 318, 418, 518, 618, 718, 818, 918: Second interlayer insulating film
119, 219, 319, 419, 519, 619, 719, 819, 919: Third interlayer insulating film
120a, 220a, 320a, 420a, 620a, 631a, 720a, 820a: ITO layer
120c, 220c, 320c, 420c, 520c, 620c, 720c, 820c, 131c, 431c, 531c, 631c, 731c: Mo layer
120d, 220d, 320d, 420d, 520d, 620d, 720d, 820d, 131d, 431d, 531d, 631d, 731d: Al layer
120e, 220e, 320e, 420e, 520e, 720e, 820e, 131e, 431e, 731e: IZO layer
121, 221, 321, 421, 521, 621, 721, 821, 921: Sealing member
124, 224, 324, 424, 524, 624, 724, 824: Power source wiring
131, 431, 531, 631, 731: Pixel electrode
131a, 431a, 531a, 731a: Transparent electrode
131b, 431b, 531b, 731b: Reflective electrode
215, 315: Source-drain electrode
223, 323: Fourth interlayer insulating film
722: Insulating film

The invention claimed is:
1. A circuit board comprising:
a substrate,
a driver circuit for driving a pixel provided on the substrate,
a first external connection terminal and a second external connection terminal provided on the substrate, the first external connection terminal and the second external connection terminal not being electrically connected to each other,
wherein the circuit board further includes a wiring that is arranged just below the first and second external connection terminals, and in a layer lower than the first and second external connection terminals to overlap therewith,
the wiring includes a first connection wiring that is electrically connected to the first external connection terminal,
the first connection wiring overlaps with the second external connection terminal to which the first connection wiring is not electrically connected,
the first connection wiring is perpendicular to the first external connection terminal and the second external connection terminal,
the second external connection terminal is electrically connected to another wiring which is different from the first connection wiring,
the first and the second external connection terminals extend in the same direction in parallel with each other from a display region;
wherein the wiring further includes a second connection wiring that is electrically connected to the second external connection terminal, and not electrically connected to the first external connection terminal, and
the first connection wiring is arranged in a first layer and the second connection wiring is arranged in a second layer different from the first layer to overlap therewith and parallel with each other.
2. The circuit board according to claim 1,
wherein as the first connection wiring, a drawing wiring that transmits a signal from the external connection terminal to the driver circuit is arranged.
3. The circuit board according to claim 1,
wherein as the first connection wiring, a power source wiring that supplies a power source for driving a circuit from the external connection terminal is arranged.
4. The circuit board according to claim 1,
wherein the wirings further include a circuit-constituting wiring that constitutes a circuit in addition to the connection wiring.
5. The circuit board according to claim 1,
wherein as the first connection wiring, a drawing wiring that transmits a signal from the external connection terminal to the driver circuit and a power source wiring that supplies a power source for driving a circuit from the external connection terminal are arranged.
6. The circuit board according to claim 1, wherein the wiring further includes a circuit-constituting wiring that constitutes a circuit in addition to the connection wiring, and
wherein as the first connection wiring, a drawing wiring that transmits a signal from the external connection terminal to the driver circuit is arranged.
7. The circuit board according to claim 1, wherein the wiring further includes a circuit-constituting wiring that constitutes a circuit in addition to the connection wiring, and
wherein as the first connection wiring, a power source wiring that supplies a power source for driving a circuit from the external connection terminal is arranged.
8. The circuit board according to claim 1, wherein the wiring further includes a circuit-constituting wiring that constitutes a circuit in addition to the connection wiring, and
wherein as the first connection wiring, a drawing wiring that transmits a signal from the external connection terminal to the driver circuit, and a power source wiring that supplies a power source for driving a circuit from the external connection terminal are arranged.
9. The circuit board according to claim 1,
wherein as the first connection wiring, a drawing wiring that transmits a signal from the external connection terminal to the driver circuit and a power source wiring that supplies a power source for driving a circuit from the external connection terminal are arranged, and
the drawing wiring and the power source wiring are arranged in the same layer.
10. The circuit board according to claim 1, wherein the wiring further includes a circuit-constituting wiring that constitutes a circuit in addition to the connection wiring, and
wherein as the first connection wiring, a drawing wiring that transmits a signal from the external connection terminal to the driver circuit is arranged, and
the drawing wiring and the circuit-constituting wiring are arranged in the same layer.

11. The circuit board according to claim 1, wherein the wiring further includes a circuit-constituting wiring that constitutes a circuit in addition to the connection wiring, and
wherein as the first connection wiring, a power source wiring that supplies a power source for driving a circuit from the external connection terminal is arranged, and
the power source wiring and the circuit-constituting wiring are arranged in the same layer.

12. The circuit board according to claim 1, wherein the wiring further includes a circuit-constituting wiring that constitutes a circuit in addition to the connection wiring, and
wherein as the first connection wiring, a drawing wiring that transmits a signal from the external connection terminal to the driver circuit, and a power source wiring that supplies a power source for driving a circuit from the external connection terminal are arranged, and
the drawing wiring, the power source wiring, and the circuit-constituting wiring are arranged in the same layer.

13. The circuit board according to claim 1,
wherein as the first connection wiring, a drawing wiring that transmits a signal to the driver circuit from the external connection terminal and a power source wiring that supplies a power source for driving a circuit from the external connection terminal are arranged, and
the drawing wiring and the power source are arranged to overlap with each other.

14. The circuit board according to claim 1, wherein the wiring further includes a circuit-constituting wiring that constitutes a circuit in addition to the connection wiring, and
wherein as the first connection wiring, a drawing wiring that transmits a signal to the driver circuit from the external connection terminal is arranged, and
the drawing wiring and the circuit-constituting wiring are arranged to overlap with each other.

15. The circuit board according to claim 1, wherein the wiring further includes a circuit-constituting wiring that constitutes a circuit in addition to the connection wiring, and
wherein as the first connection wiring, a power source wiring that supplies a power source for driving a circuit from the external connection terminal is arranged, and
the power source wiring and the circuit-constituting wiring are arranged to overlap with each other.

16. The circuit board according to claim 1, wherein the wiring further includes a circuit-constituting wiring that constitutes a circuit in addition to the connection wiring, and
wherein as the first connection wiring, a drawing wiring that transmits a signal to the driver circuit from the external connection terminal, and a power source wiring that supplies a power source for driving a circuit from the external connection terminal are arranged, and
at least two wirings selected from the group consisting of the drawing wiring, the power source wiring, and the circuit-constituting wiring are arranged to overlap with each other.

17. The circuit board according to claim 1, wherein the wiring further includes a circuit-constituting wiring that constitutes a circuit in addition to the connection wiring, and
wherein as the first connection wiring, a drawing wiring that transmits a signal to the driver circuit from the external connection terminal, and a power source wiring that supplies a power source for driving a circuit from the external connection terminal are arranged, and
the drawing wiring, the power source wiring, and the circuit-constituting wiring are arranged to overlap with one another.

18. The circuit board according to claim 1,
wherein as the first connection wiring, a drawing wiring that transmits a signal to the driver circuit from the external connection terminal and a power source wiring that supplies a power source for driving a circuit from the external connection terminal are arranged, and
the drawing wiring, the power source wiring, and a circuit are arranged to overlap with one another.

19. The circuit board according to claim 1, wherein the wiring further includes a circuit-constituting wiring that constitutes a circuit in addition to the connection wiring, and
wherein as the first connection wiring, a drawing wiring that transmits a signal to the driver circuit from the external connection terminal, and a power source wiring that supplies a power source for driving a circuit from the external connection terminal are arranged,
the drawing wiring and the power source wiring are arranged in the same layer, and
the circuit-constituting wiring is arranged to overlap with at least one of the drawing wiring and the power source wiring.

20. The circuit board according to claim 1, wherein the wiring further includes a circuit-constituting wiring that constitutes a circuit in addition to the connection wiring, and
wherein as the first connection wiring, a drawing wiring that transmits a signal to the driver circuit from the external connection terminal, and a power source wiring that supplies a power source for driving a circuit from the external connection terminal are arranged,
the drawing wiring and the circuit-constituting wiring are arranged in the same layer, and
the power source wiring is arranged to overlap with at least one of the drawing wiring and the circuit-constituting wiring.

21. The circuit board according to claim 1, wherein the wiring further includes a circuit-constituting wiring that constitutes a circuit in addition to the connection wiring, and
wherein as the first connection wiring, a drawing wiring that transmits a signal to the driver circuit from the external connection terminal, and a power source wiring that supplies a power source for driving a circuit from the external connection terminal are arranged,
the power source wiring and the circuit-constituting wiring are arranged in the same layer, and
the drawing wiring is arranged to overlap with at least one of the power source wiring and the circuit-constituting wiring.

22. The circuit board according to claim 1,
wherein as the first connection wiring, a drawing wiring that transmits a signal to the driver circuit from the external connection terminal and a power source wiring that supplies a power source for driving a circuit from the external connection terminal are arranged,
the drawing wiring and the power source wiring are arranged in the same layer, and
at least one of the drawing wiring and the power source wiring is arranged to overlap with a circuit.

23. The circuit board according to claim 8,
wherein the circuit board includes a first interlayer film and a second interlayer film, and
the first interlayer film; the drawing wiring and the power source wiring; and the second interlayer film are stacked in this order in layers upper than the circuit-constituting wiring.

24. The circuit board according to claim 8,
wherein the circuit board includes a first interlayer film, a second interlayer film, and a third interlayer film, the first interlayer film, the drawing wiring, the second interlayer film, the power source wiring, and the third interlayer film are stacked in this order in layers upper than the circuit-constituting wiring.

25. The circuit board according to claim 8,
wherein the circuit board includes a first interlayer film, a second interlayer film, and a third interlayer film,
the first interlayer film, the power source wiring, the second interlayer film, the drawing wiring, and the third interlayer film are stacked in this order in layers upper than the circuit-constituting wiring.

26. The circuit board according to claim 1,
wherein the external connection terminal is a multi-layer body including an aluminum-containing film and an anti-corrosion conductive film.

27. The circuit board according to claim 26,
wherein the anti-corrosion conductive film is an indium zinc oxide film, and
the aluminum-containing film and the indium zinc oxide film are stacked in this order from a side of the substrate to constitute the external connection terminal.

28. The circuit board according to claim 27,
wherein an indium tin oxide film, the aluminum-containing film, and the indium zinc oxide film are stacked in this order from the side of the substrate to constitute the external connection terminal.

29. The circuit board according to claim 27,
wherein the circuit board includes, in the pixel, a transparent electrode including the indium zinc oxide film.

30. The circuit board according to claim 26,
wherein the anti-corrosion conductive film is an indium tin oxide film, and
the aluminum-containing film and the indium tin oxide film are stacked in this order from a side of the substrate to constitute the external connection terminal.

31. The circuit board according to claim 30,
wherein an indium zinc oxide film, the aluminum-containing film, and the indium tin oxide film are stacked in this order from the side of the substrate to constitute the external connection terminal.

32. The circuit board according to claim 30,
wherein the circuit board includes, in the pixel, a transparent electrode including the indium tin oxide film.

33. The circuit board according to claim 26,
wherein the circuit board includes, in the pixel, a reflective electrode including a film constituting the external connection terminal.

34. The circuit board according to claim 33,
wherein the anti-corrosion conductive film is an indium tin oxide film, and
the aluminum-containing film and the indium tin oxide film are stacked in this order from a side of the substrate to constitute the reflective electrode.

35. The circuit board according to claim 1,
wherein the circuit board includes, in the pixel, a reflective electrode including a layer constituting the external connection terminal.

36. The circuit board according to claim 26,
wherein in the external connection terminal, the anti-corrosion conductive film covers a side surface and a surface on a side opposite to the substrate of the aluminum-containing film.

37. The circuit board according to claim 26,
wherein the circuit board includes, in the pixel, a reflective electrode including the aluminum-containing film and an indium tin oxide film, stacked in this order from a side of the substrate,
the anti-corrosion conductive film is an indium tin oxide film, and
in each of the external connection terminal and the reflective electrode,
the anti-corrosion conductive film covers a side surface and a surface on a side opposite to the substrate of the aluminum-containing film.

38. The circuit board according to claim 1,
wherein at least one of the first and second external connection terminals is arranged to overlap with a region where a sealing member for attaching the circuit board to another substrate is arranged, and
in the region, an insulating film is arranged on the external connection terminal.

39. The circuit board according to claim 1,
wherein at least one of the first and second external connection terminals is positioned outside a region where a sealing member for attaching the circuit board to another substrate is arranged.

40. A display device comprising the circuit board according to claim 1.

41. A liquid crystal display device comprising the circuit board according to claim 1.

42. The circuit board according to claim 1, further comprising:
a display region provided on the substrate, wherein
the wiring further includes a third connection wiring that is not electrically connected to the first external terminal,
the first connection wiring is electrically connected to the first external connection terminal though a contact hole, and
the first external connection terminal overlaps with the third connection wiring within a region between the contact hole and the display region.

43. The circuit board according to claim 1, wherein the another wiring does not overlap with the first connection wiring and does not extend to the first connection wiring from the second external connection terminal.

44. A circuit board comprising:
a substrate,
a driver circuit for driving a pixel provided on the substrate,
a first external connection terminal and a second external connection terminal provided on the substrate,
the first external connection terminal and the second external connection terminal not being electrically connected to each other,
wherein the circuit board further includes a wiring that is arranged below the first and the second external connection terminals, and in a layer lower than the first and the second external connection terminals to overlap therewith,
the wiring includes a first connection wiring that is electrically connected to the first external connection terminal,
the first connection wiring overlaps with the second external connection terminal to which the first connection wiring is not electrically connected,
the first connection wiring is perpendicular to the first external connection terminal and the second external connection terminal when viewed from a direction perpendicular to the substrate, and
the second external connection terminal is electrically connected to another wiring which is different from the first connection wiring;

wherein the wiring further includes a second connection wiring that is electrically connected to the second external connection terminal, and not electrically connected to the first external connection terminal, and the first connection wiring is arranged in a first layer and the second connection wiring is arranged in a second layer different from the first layer to overlap therewith and parallel with each other.

* * * * *